(12) United States Patent
R et al.

(10) Patent No.: US 11,956,116 B2
(45) Date of Patent: *Apr. 9, 2024

(54) PROGRAMMABLE DIAGNOSIS MODEL FOR CORRELATION OF NETWORK EVENTS

(71) Applicant: Juniper Networks, Inc., Sunnyvale, CA (US)

(72) Inventors: Jayanthi R, Bangalore (IN); Chandrasekhar A, Bangalore (IN); Javier Antich, Valencia (ES); Sri Sampath Mallipudi, Bengaluru (IN); Premchandar N, Bangalore (IN); Harsha Lakshmikanth, Bangalore (IN); Gregory A. Sidebottom, Ottawa (CA); Zhifei Fang, Ottawa (CA)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/066,407

(22) Filed: Dec. 15, 2022

(65) Prior Publication Data

US 2023/0208701 A1 Jun. 29, 2023

Related U.S. Application Data

(63) Continuation of application No. 16/821,745, filed on Mar. 17, 2020, now Pat. No. 11,533,215.

(30) Foreign Application Priority Data

Jan. 31, 2020 (IN) .............................. 202041004313

(51) Int. Cl.
*H04L 41/0631* (2022.01)
*H04L 41/0604* (2022.01)
(Continued)

(52) U.S. Cl.
CPC ...... *H04L 41/0631* (2013.01); *H04L 41/0604* (2013.01); *H04L 41/064* (2013.01);
(Continued)

(58) Field of Classification Search
CPC .... G06F 11/079; H04L 41/06; H04L 41/0604; H04L 41/0631; H04L 41/064;
(Continued)

(56) References Cited

U.S. PATENT DOCUMENTS 6,286,047 B1 * 9/2001 Ramanathan ......... H04L 41/046
370/254
6,336,138 B1 1/2002 Caswell et al.
(Continued)

FOREIGN PATENT DOCUMENTS

CN 1529455 A 9/2004
CN 102473129 A 5/2012
(Continued)

OTHER PUBLICATIONS

Chen, Pengfei, et al. "Causeinfer: Automatic and distributed performance diagnosis with hierarchical causality graph in large distributed systems." IEEE INFOCOM 2014—IEEE Conference on Computer Communications. IEEE, 2014. (Year: 2014).*
(Continued)

*Primary Examiner* — Vivek Srivastava
*Assistant Examiner* — William C McBeth
(74) *Attorney, Agent, or Firm* — Shumaker & Sieffert, P.A.

(57) ABSTRACT

Network management techniques are described. A controller device of this disclosure manages a device group of a network. The controller device includes processing circuitry in communication with the memory, the processing circuitry being configured to receive, using a programmable diagnosis service executed by the processing circuitry, a program-
(Continued)

ming input, to form, using the programmable diagnosis service, based on the programming input, a resource definition graph that models interdependencies between a plurality of resources supported by the device group, to detect, using the programmable diagnosis service, an event affecting a first resource of the plurality of resources, and to identify, using the programmable diagnosis service, based on the interdependencies modeled in the resource definition graph formed based on the programming input, a root cause event that caused the event affecting the first resource, the root cause event occurring at a second resource of the plurality of resources.

17 Claims, 8 Drawing Sheets

(51) Int. Cl.
　　*H04L 41/0806* 　　(2022.01)
　　*H04L 43/0823* 　　(2022.01)
　　*H04L 43/16* 　　(2022.01)
(52) U.S. Cl.
　　CPC ...... *H04L 41/0806* (2013.01); *H04L 43/0823* (2013.01); *H04L 43/16* (2013.01); *H04L 41/065* (2013.01)
(58) Field of Classification Search
　　CPC . H04L 41/065; H04L 41/069; H04L 41/0806; H04L 41/12; H04L 41/14; H04L 41/142; H04L 41/145; H04L 41/22
　　See application file for complete search history.

(56) References Cited

U.S. PATENT DOCUMENTS

| | | | |
|---|---|---|---|
| 7,552,447 B2 | 6/2009 | Uthe | |
| 7,865,888 B1 | 1/2011 | Qureshi et al. | |
| 8,001,527 B1* | 8/2011 | Qureshi | G06F 11/079 |
| | | | 717/172 |
| 8,954,972 B2 | 2/2015 | Lam et al. | |
| 9,104,572 B1* | 8/2015 | Thompson | H04L 41/0631 |
| 9,189,319 B2 | 11/2015 | Ito et al. | |
| 9,692,671 B2 | 6/2017 | Groenendijk et al. | |
| 10,187,260 B1 | 1/2019 | Chen et al. | |
| 10,516,761 B1 | 12/2019 | A et al. | |
| 10,970,143 B1 | 4/2021 | Wade et al. | |
| 11,086,709 B1* | 8/2021 | Ratkovic | G06F 11/079 |
| 11,165,631 B1* | 11/2021 | Chitalia | H04L 41/0631 |
| 11,269,711 B2 | 3/2022 | R et al. | |
| 11,269,718 B1* | 3/2022 | Chen | G06F 11/079 |
| 11,405,260 B2 | 8/2022 | A et al. | |
| 11,627,034 B1* | 4/2023 | Chawathe | H04L 41/0631 |
| | | | 709/224 |
| 2002/0022952 A1 | 2/2002 | Zager et al. | |
| 2004/0049372 A1 | 3/2004 | Keller | |
| 2004/0049565 A1 | 3/2004 | Keller et al. | |
| 2004/0268335 A1 | 12/2004 | Martin et al. | |
| 2005/0181835 A1* | 8/2005 | Lau | H04L 41/0631 |
| | | | 455/567 |
| 2005/0210132 A1* | 9/2005 | Florissi | H04L 41/0631 |
| | | | 709/224 |
| 2005/0262106 A1 | 11/2005 | Enqvist | |
| 2005/0289395 A1 | 12/2005 | Katsuyama et al. | |
| 2006/0235962 A1* | 10/2006 | Vinberg | H04L 41/0631 |
| | | | 709/224 |
| 2007/0294051 A1* | 12/2007 | Sanghvi | G06F 11/079 |
| | | | 702/182 |
| 2008/0016115 A1 | 1/2008 | Bahl et al. | |
| 2008/0021918 A1 | 1/2008 | Rao | |
| 2008/0222287 A1 | 9/2008 | Bahl et al. | |
| 2010/0115341 A1* | 5/2010 | Baker | G06F 11/079 |
| | | | 709/224 |
| 2011/0154367 A1 | 6/2011 | Gutjahr et al. | |
| 2011/0231704 A1 | 9/2011 | Ge et al. | |
| 2012/0222745 A1 | 9/2012 | Kolarsky | |
| 2013/0097183 A1 | 4/2013 | McCracken | |
| 2013/0339515 A1 | 12/2013 | Radhakrishnan | |
| 2014/0222745 A1 | 8/2014 | Deng et al. | |
| 2015/0199226 A1 | 7/2015 | Wu et al. | |
| 2015/0280968 A1* | 10/2015 | Gates | H04L 41/0631 |
| | | | 714/37 |
| 2015/0280969 A1* | 10/2015 | Gates | H04L 41/0631 |
| | | | 714/37 |
| 2015/0319090 A1 | 11/2015 | Fu et al. | |
| 2017/0075749 A1 | 3/2017 | Ambichl et al. | |
| 2017/0102997 A1 | 4/2017 | Purushothaman et al. | |
| 2017/0279687 A1 | 9/2017 | Muntes-Mulero et al. | |
| 2017/0288940 A1 | 10/2017 | Lagos et al. | |
| 2017/0372212 A1 | 12/2017 | Zasadzinski et al. | |
| 2018/0054351 A1 | 2/2018 | Bhandari et al. | |
| 2018/0136987 A1 | 5/2018 | He et al. | |
| 2018/0218264 A1 | 8/2018 | Renders et al. | |
| 2019/0081850 A1 | 3/2019 | Nazar et al. | |
| 2019/0165988 A1 | 5/2019 | Wang et al. | |
| 2019/0227860 A1* | 7/2019 | Gefen | G06F 11/079 |
| 2019/0230003 A1 | 7/2019 | Gao et al. | |
| 2019/0356403 A1 | 11/2019 | V.K. et al. | |
| 2020/0042426 A1* | 2/2020 | Ambichl | G06F 11/079 |
| 2021/0026723 A1 | 1/2021 | Nadger et al. | |
| 2021/0037081 A1 | 2/2021 | Slavik | |
| 2021/0152416 A1 | 5/2021 | A et al. | |
| 2021/0243068 A1 | 8/2021 | R et al. | |
| 2021/0271522 A1 | 9/2021 | Butterworth et al. | |
| 2022/0019494 A1 | 1/2022 | R et al. | |
| 2022/0029876 A1* | 1/2022 | Mercian | H04L 41/0631 |
| 2022/0179726 A1 | 6/2022 | R et al. | |

FOREIGN PATENT DOCUMENTS

| | | |
|---|---|---|
| CN | 104584483 A | 4/2015 |
| EP | 2961100 A1 | 12/2015 |
| WO | 2013/055760 A1 | 4/2013 |

OTHER PUBLICATIONS

Qiu, Juan, et al. "A causality mining and knowledge graph based method of root cause diagnosis for performance anomaly in cloud applications." Applied Sciences 10.6 (2020): 2166. (Year: 2020).*
Dandona, Divyaansh, Mevlut Demir, and John J. Prevost. "Graph Based Root Cause Analysis in Cloud Data Center." 2020 IEEE 15th International Conference of System of Systems Engineering (SoSE). IEEE, 2020. (Year: 2020).*
Weng, Jianping, et al. "Root cause analysis of anomalies of multitier services in public clouds." IEEE/ACM Transactions on Networking 26.4 (2018): 1646-1659. (Year: 2018).*
Bahl et al., "Towards Highly Reliable Enterprise Network Services Via Inference of Multi-level Dependencies," ACM SIGCOMM Computer Communication Review, Aug. 27-31, 2007, pp. 13-24.
Bjorklund, "Yang—A Data Modeling Language for the Network Configuration Protocol (NETCONF)," Internet Engineering Task Force (IETF), RFC 6020, Oct. 2010, 173 pp.
Clemm et al., "A YANG Data Model for Network Topologies" Internet Engineering Task Force (IETF) RFC 8345, Mar. 2018, 57 pp.
Extended Search Report from counterpart European Application No. 20178806.4, dated Nov. 19, 2020, 8 pp.
Gruschke, "Integrated event management: Event correlation using dependency graphs," In Proceedings of the 9th IFIP/IEEE International Workshop on Distributed Systems: Operations & Management (DSOM 98). Oct. 1998, 12 pp.
Harrington et al., "An Architecture for Describing Simple Network Management Protocol (SNMP) Management Frameworks," Network Working Group, RFC 3411, Dec. 2002, 64 pp.
Huang et al., "Performance Diagnosis for SOA on Hybrid Cloud Using the Markov Network Model," 2013 IEEE 6th International Conference on Service-Oriented Computing and Applications, Koloa, Hawaii, Dec. 16-18, 2013, pp. 17-24.

(56) References Cited

OTHER PUBLICATIONS

Katker et al., "Fault isolation and event correlation for integrated fault management", International Symposium on Integrated Network Management, Springer, Boston, MA, 1997, 583-596 pp., (Applicant points out, in accordance with MPEP 609.04(a), that the year of publication, 1997, is sufficiently earlier than the effective U.S. filing date, so that the particular month of publication is not in issue.).

Prosecution History from U.S. Appl. No. 16/821,745, dated Jul. 12, 2021 through Aug. 16, 2022, 95 pp.

Response to Extended Search Report dated Nov. 19, 2020, from counterpart European Application No. 20178806.4 filed Feb. 4, 2022, 18 pp.

Sanchez et al., "Self-Modeling based Diagnosis of Services over Programmable Networks," 2016 IEEE NetSoft Conference and Workshops (NetSoft), Seoul, Korea (South), Jun. 2016, 10 pp.

Schoenwaelder, "Common YANG Data Types" Internet Engineering Task Force (IETF), RFC 6991, Jul. 2013, 30 pp.

Steinder et al., "A survey of fault localization techniques in computer networks," Science Direct, Science of Computer Programming, vol. 53, Issue 2, Nov. 2004, pp. 165-194.

Yan et al., "G-RCA: A Generic Root Cause Analysis Platform for Service Quality Management in Large IP Networks" IEEE/ACM Transactions on Networking; vol. 20, Issue: 6, Dec. 2012, pp. 1734-1747.

First Office Action and Search Report, and translation thereof, from counterpart Chinese Application No. 202010454714.5 dated Mar. 16, 2023, 23 pp.

Communication pursuant to Article 94(3) EPC from counterpart European Application No. 20178806.4 dated Sep. 18, 2023, 4 pp.

Response to Communication pursuant to Article 94(3) EPC dated Sep. 18, 2023, from counterpart European Application No. 20178806.4 dated Jan. 18, 2024, 15 pp.

\* cited by examiner

PROGRAMMABLE DIAGNOSIS MODEL FOR CORRELATION OF NETWORK EVENTS

This application is a continuation of U.S. application Ser. No. 16/821,745, filed Mar. 17, 2020, which claims benefit of priority from India Provisional Application No. 202041004313 filed on 31 Jan. 2020, the entire contents of each of which are incorporated herein by reference.

TECHNICAL FIELD

This disclosure relates to computer networks, and more particularly, to management of network devices.

BACKGROUND

A computer network is a collection of interconnected computing devices that can exchange data and share resources. A variety of devices operate to facilitate communication between the computing devices. For example, a computer network may include routers, switches, gateways, firewalls, and a variety of other devices to provide and facilitate network communication.

These network devices typically include mechanisms, such as management interfaces, for locally or remotely configuring the devices. By interacting with the management interface, a client can perform configuration tasks as well as perform operational commands to collect and view operational data of the managed devices. For example, the clients may configure interface cards of the device, adjust parameters for supported network protocols, specify physical components within the device, modify routing information maintained by a router, access software modules and other resources residing on the device, and perform other configuration tasks. In addition, the clients may allow a user to view current operating parameters, system logs, information related to network connectivity, network activity or other status information from the devices as well as view and react to event information received from the devices.

Network configuration services may be performed by multiple distinct devices, such as routers with service cards and/or dedicated service devices. Such services include connectivity services such as Layer Three Virtual Private Network (L3VPN), Virtual Private Local Area Network Service (VPLS), and Peer to Peer (P2P) services. Other services include network configuration services, such as Dot1q VLAN Service. Network management systems (NMSs) and NMS devices, also referred to as controllers or controller devices, may support these services such that an administrator can easily create and manage these high-level network configuration services.

In particular, user configuration of devices may be referred to as "intents." An intent-based networking system lets administrators describe the intended network/compute/storage state. User intents can be categorized as business policies or stateless intents. Business policies, or stateful intents, may be resolved based on the current state of a network. Stateless intents may be fully declarative ways of describing an intended network/compute/storage state, without concern for a current network state.

Intents may be represented as intent data models, which may be modeled using unified graphs. Intent data models may be represented as connected graphs, so that business policies can be implemented across intent data models. For example, data models may be represented using connected graphs having vertices connected with has-edges and reference (ref) edges. Controller devices may model intent data models as unified graphs, so that the intend models can be represented as connected. In this manner, business policies can be implemented across intent data models. When Intents are modeled using a unified graph model, extending new intent support needs to extend the graph model and compilation logic.

In order to configure devices to perform the intents, a user (such as an administrator) may write translation programs that translate high-level configuration instructions (e.g., instructions according to an intent data model, which may be expressed as a unified graph model) to low-level configuration instructions (e.g., instructions according to a device configuration model). As part of configuration service support, the user/administrator may provide the intent data model and a mapping between the intent data model to a device configuration model.

In order to simplify the mapping definition for the user, controller devices may be designed to provide the capability to define the mappings in a simple way. For example, some controller devices provide the use of Velocity Templates and/or Extensible Stylesheet Language Transformations (XSLT). Such translators contain the translation or mapping logic from the intent data model to the low-level device configuration model. Typically, a relatively small number of changes in the intent data model impact a relatively large number of properties across device configurations. Different translators may be used when services are created, updated, and deleted from the intent data model.

SUMMARY

In general, this disclosure describes techniques for managing network devices. A network management system (NMS) device, also referred to herein as a controller device, may configure network devices using low-level (that is, device-level) configuration data, e.g., expressed in Yet Another Next Generation (YANG) data modeling language. According to the techniques described herein, the controller device may configure the network devices at individual component level or individual service level. The controller device implements a programmable network diagnosis model to provide root cause analysis (RCA) for events (e.g., faults) detected over the network. The programmable network diagnosis model of this disclosure applies model traversal techniques over a resource definition graph that accounts for device resources, service resources provided by the network devices, and the interdependencies between the various resources.

The programmable network diagnosis model permits for programming cause and effect relationships between resource events, and to initialize telemetry rules for both devices resources and service-associated device resources. Additionally, the programmable network diagnosis model enables forward chaining-based RCA by automatically deriving inference rules, and accounts for temporal relations between network events. The programmability of the network diagnosis model enables the controller device to perform the forward chaining-based RCA techniques of this disclosure while accommodating dynamic network changes. In this way, the programmable network diagnosis model is scalable in that the controller device may program the model to accommodate changes to the size or configuration of the network, and to support numerous resources implemented by the network devices.

In one example, this disclosure is directed to a method of monitoring a device group of a network. The method includes receiving, by a programmable diagnosis service running on a controller device that manages the device group, a programming input and forming, by the programmable diagnosis service, based on the programming input, a resource definition graph that models interdependencies between a plurality of resources supported by the device group. The method further includes detecting, by the programmable diagnosis service, an event affecting a first resource of the plurality of resources, and identifying, based on the interdependencies modeled in the resource definition graph formed based on the programming input, a root cause event that caused the event affecting the first resource, the root cause event occurring at a second resource of the plurality of resources.

In another example, this disclosure is directed to a controller device for managing a device group of a network. The controller device includes a network interface, a memory, and processing circuitry in communication with the memory. The processing circuitry is configured to receive, using a programmable diagnosis service executed by the processing circuitry, a programming input, and to form, using the programmable diagnosis service, based on the programming input, a resource definition graph that models interdependencies between a plurality of resources supported by the device group. The processing circuitry is further configured to detect, using the programmable diagnosis service, an event affecting a first resource of the plurality of resources, and to identify, using the programmable diagnosis service, based on the interdependencies modeled in the resource definition graph formed based on the programming input, a root cause event that caused the event affecting the first resource, the root cause event occurring at a second resource of the plurality of resources.

In another example, this disclosure is directed to a controller device for managing a device group of a network. The controller device includes means for receiving, using a programmable diagnosis service executed by the processing circuitry, a programming input, and means for forming, using the programmable diagnosis service, based on the programming input, a resource definition graph that models interdependencies between a plurality of resources supported by the device group. The controller device further includes means for detecting, using the programmable diagnosis service, an event affecting a first resource of the plurality of resources, and means for identifying, using the programmable diagnosis service, based on the interdependencies modeled in the resource definition graph formed based on the programming input, a root cause event that caused the event affecting the first resource, the root cause event occurring at a second resource of the plurality of resources.

In another example, this disclosure is directed to a non-transitory computer-readable medium encoded with instructions. When executed, the instructions cause processing circuitry of a controller device for managing a device group of a network to receive, using a programmable diagnosis service executed by the processing circuitry, a programming input, to form, using the programmable diagnosis service, based on the programming input, a resource definition graph that models interdependencies between a plurality of resources supported by the device group, to detect, using the programmable diagnosis service, an event affecting a first resource of the plurality of resources, and to identify, using the programmable diagnosis service, based on the interdependencies modeled in the resource definition graph formed based on the programming input, a root cause event that caused the event affecting the first resource, the root cause event occurring at a second resource of the plurality of resources.

The programmable network diagnosis model of this disclosure provides several technical improvements over existing RCA technology. Networks are dynamic with respect to their structures and components (e.g., structures and/or configurations thereof). The programmable network diagnosis model enables administrators to adapt the correlation system to accommodate changes in the network topology, the component types and versions, and the services offered. Because the offered services can change and grow in number because of potential differences between customers or entities catered to, the programmability of the network diagnosis model enables integration of new services with respect to the forward chaining-based RCA techniques of this disclosure. In this way, the programmable network diagnosis model of this disclosure provides scalable and reliable error resilience over networks that incorporate diverse devices and support diverse resources.

The details of one or more examples are set forth in the accompanying drawings and the description below. Other features, objects, and advantages will be apparent from the description and drawings, and from the claims.

DETAILED DESCRIPTION

Figure 1:
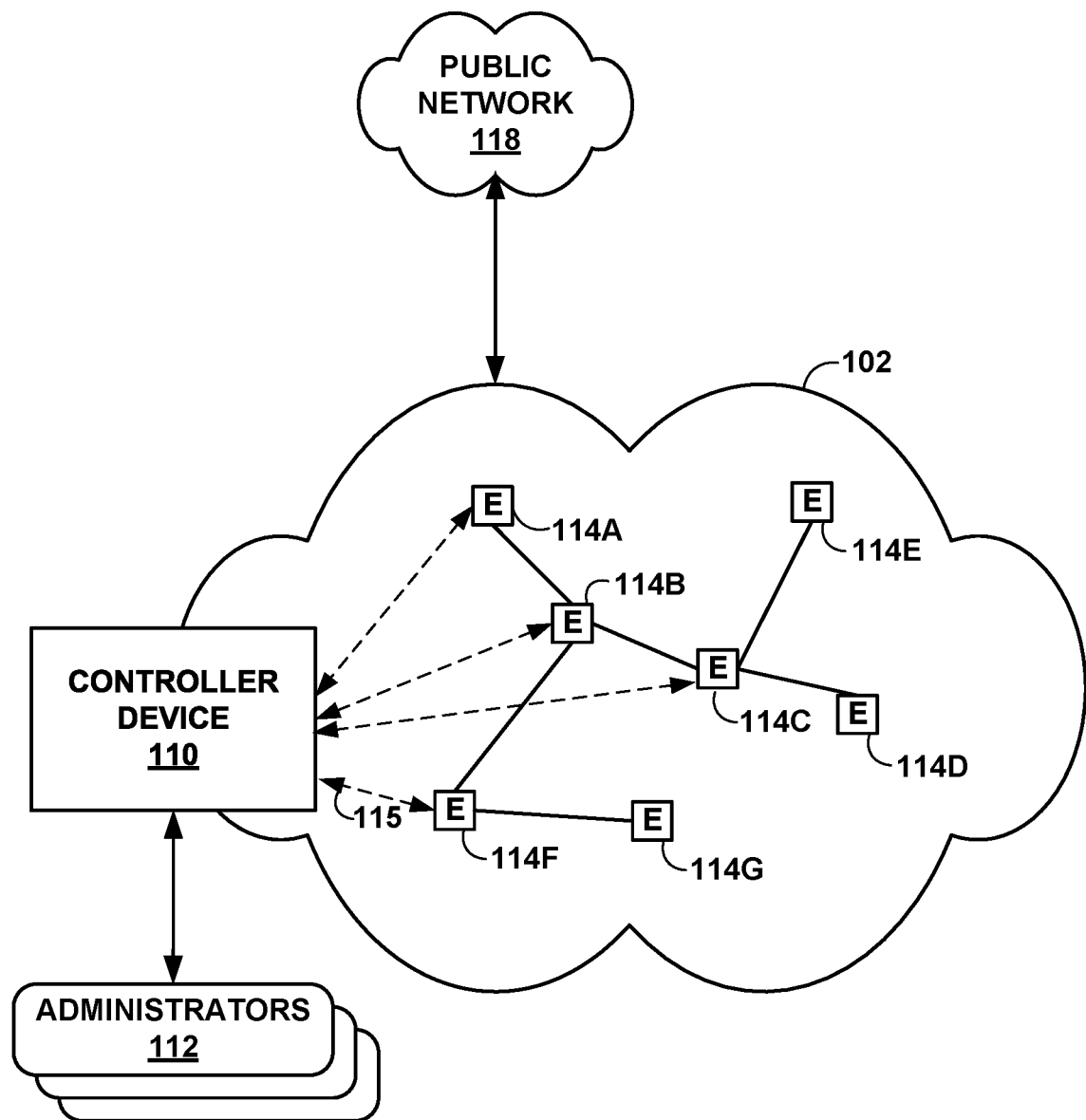
FIG. 1 is a block diagram illustrating an example including elements of an enterprise network that are managed using a controller device of this disclosure.

Fault diagnosis (sometimes referred to as "root cause analysis" or "RCA") is a process to identify the initiating condition or event that triggers a network component failure from a set of possible candidate events/conditions that are generated or present within a discrete time window. RCA is a critical task for operators to maintain a properly functioning network. A few possible techniques to perform RCA include a model traversing technique and a dependency graph technique.

The model traversing technique uses object models to determine fault propagation. The network is represented using various components and relationships between the components. Based on this model representing the network, fault dependencies can be inferred and used to identify the root cause of an issue. Model traversing techniques do not specify fault dependencies directly, but instead, derive the fault dependencies from the model during run-time. These techniques are suitable for a network that changes frequently. However, by themselves, model traversing techniques cannot deal with more complex fault propagation scenarios (e.g., basing fault propagation on an assumption that only one issue happens at a time, etc.).

The dependency graph technique uses a directed graph to model dependencies between the object events. Nodes represent network elements (e.g., hosts). An edge from node A: event to node B: event indicates that the failures in node A can cause failures in node B. Dependency graphs are often used in networks with infrequent changes. In networks with frequent changes, the dependencies need to be updated frequently. Network complexity is on the increase, particularly in light of the rapid increase in the number of connected devices, the relatively complex topology of distributed networks, and increasing internet of things (IoT) adoption. These factors also contribute to the heterogeneity of networks, due to the differences in device capabilities and configurations. For example, one network can be overlaid on top of another network. For example, virtual private networks (VPNs) are overlaid on internet protocol (IP) networks that use it as a transport layer. Network troubleshooters need a mechanism by which to correlate the issues across layers with a generic model-driven solution that can be applied to any network and service topology that can support networks with frequent changes and support multiple concurrent faults at a time.

Because networks are dynamic with respect to their structures and components, adaptability of the correlation system to ongoing changes in the network topology, component types and versions, and the services offered represents a technical improvement over existing RCA technologies. Programmable diagnosis services of this disclosure provide scalability and response times that enable reliable RCA over dynamic, heterogenous networks. The programmable diagnosis model of this disclosure enables network administrators to program the network and device resources including service resources, device resources, and resource dependencies therebetween. Additionally, the programmable diagnosis model of this disclosure enables network administrators to program cause-and-effect relationships between resource events that may occur within the network.

The programmable diagnosis model of this disclosure enables network administrators to initialize telemetry rules, either with device resource properties in the case of device resources, or via service association inheritance in the case of service-associated device resources. Based on the model programmed in this way, the controller may automatically derive inference rules with respect to resource event inter-relationships. The controller may continually update the inference rules, and may implement the inference rules to perform RCA based on forward chaining of network resource events. Additionally, the programmable diagnosis model of this disclosure enables the incorporation of temporal relationships between resource events to perform RCA among potentially interrelated events. The inference rules are augmented with temporal constraints to enable temporal-based RCA.

Aspects of the underlying element and service models are described in U.S. patent application Ser. No. 16/731,372 filed on 31 Dec. 2019, the entire content of which is incorporated herein. The Network Model Aware Diagnosis technique of the present disclosure uses element models, service models, and multi-layer models. The element model accounts for network devices that uses various resources (e.g., a packet forwarding engine (PFE), a line card, interfaces, chassis, CPUs, etc.) and captures the relationships between these resources and captures dependencies between various network resource events.

The service model accounts for services spread across the devices (e.g., layer-3 (L3) VPN/virtual private LAN services (VPLS), label-switched path (LSP) tunnels, etc.). The service model comprises various events captured at the service level. The service model captures (i) service and service endpoint associations, (ii) connectivity link (path) between various endpoint (e.g., a VPN service with endpoints Node A, B, C contains a tunnel between Node A and Node B and a tunnel between Node A and Node C, etc.), (iii) dependencies across service events, (iv) dependencies across the endpoint events, and (v) dependency between device event to service event. Networks are layered, and as such, a broken link in an underlying layer or any other problem in the lower layer services cause many higher layer services to fail, even when these services are not directly connected to the failing components. The multi-layer model captures (service to service dependencies, (ii) service link to service link dependencies, and (iii) dependencies across service events.

FIG. 1 is a block diagram illustrating an example including elements of an enterprise network 102 that are managed using a controller device 110. Managed elements 114A-114G (collectively, "elements 114") of the enterprise network 102 include network devices interconnected via communication links to form a communication topology in order to exchange resources and information. The elements 114 (also generally referred to as network devices or remote network devices) may include, for example, routers, switches, gateways, bridges, hubs, servers, firewalls or other intrusion detection systems (IDS) or intrusion prevention systems (IDP), computing devices, computing terminals, printers, other network devices, or a combination of such devices. While described in this disclosure as transmitting, conveying, or otherwise supporting packets, the enterprise network 102 may transmit data according to any other discrete data unit defined by any other protocol, such as a cell defined by the Asynchronous Transfer Mode (ATM) protocol, or a datagram defined by the User Datagram Protocol (UDP). Communication links interconnecting the elements 114 may be physical links (e.g., optical, copper, and the like), wireless, or any combination thereof.

The enterprise network 102 is shown coupled to a public network 118 (e.g., the Internet) via a communication link. The public network 18 may include, for example, one or more client computing devices. The public network 18 may provide access to web servers, application servers, public databases, media servers, end-user devices, and other types of network resource devices and content.

The controller device 110 is communicatively coupled to the elements 114 via the enterprise network 102. The controller device 110, in some examples, forms part of a device management system, although only one device of the device management system is illustrated for purpose of example in FIG. 1. The controller device 110 may be coupled either directly or indirectly to the various elements 114. Once the elements 114 are deployed and activated, administrators 112 uses the controller device 110 (or multiple such management devices) to manage the network devices using a device management protocol. One example device protocol is the Simple Network Management Protocol (SNMP) that allows the controller device 110 to traverse and modify management information bases (MIBs) that store configuration data within each of the managed elements 114. Further details of the SNMP protocol can be found in Harrington et al., RFC 3411, "An Architecture for Describing Simple Network Management Protocol (SNMP) Management Frameworks," Network Working Group, the Internet Engineering Task Force draft, December 2002, available at http://tools.ietf.org/html/rfc3411, the entire contents of which are incorporated herein by reference.

In common practice, the controller device 110, also referred to as a network management system (NMS) or NMS device, and the elements 114 are centrally maintained by an information technology (IT) group of the enterprise. The administrators 112 interact with the controller device 110 to remotely monitor and configure the elements 114. For example, the administrators 112 may receive alerts from the controller device 110 regarding any of the elements 114, view configuration data of the elements 114, modify the configurations data of the elements 114, add new network devices to the enterprise network 102, remove existing network devices from the enterprise network 102, or otherwise manipulate the enterprise network 102 and network devices therein. Although described herein with respect to an enterprise network as an example use case, it will be the techniques of this disclosure are also applicable to other network types, public and private, including LANs, VLANs, VPNs, and the like.

In some examples, the administrators 112 uses controller device 10 or a local workstation to interact directly with the elements 114, e.g., through telnet, secure shell (SSH), or other such communication sessions. That is, the elements 114 generally provide interfaces for direct interaction, such as command line interfaces (CLIs), web-based interfaces, graphical user interfaces (GUIs), or the like, by which a user can interact with the devices to directly issue text-based commands. For example, these interfaces typically allow a user to interact directly with the device, e.g., through a telnet, secure shell (SSH), hypertext transfer protocol (HTTP), or other network session, to enter text in accordance with a defined syntax to submit commands to the managed element. In some examples, the user initiates an SSH session 115 with one of the elements 114, e.g., element 14F, using the controller device 110, to directly configure element 14F. In this manner, a user can provide commands in a format for execution directly to the elements 114.

Further, the administrators 112 can also create scripts that can be submitted by the controller device 110 to any or all of the elements 114. For example, in addition to a CLI interface, the elements 114 also provide interfaces for receiving scripts that specify the commands in accordance with a scripting language. In a sense, the scripts may be output by the controller device 110 to automatically invoke corresponding remote procedure calls (RPCs) on the managed the elements 114. The scripts may conform to, e.g., extensible markup language (XML) or another data description language.

The administrators 112 use the controller device 110 to configure the elements 114 to specify certain operational characteristics that further the objectives of the administrators 112. For example, the administrators 112 may specify for an element 114 a particular operational policy regarding security, device accessibility, traffic engineering, quality of service (QoS), network address translation (NAT), packet filtering, packet forwarding, rate limiting, or other policies. The controller device 110 uses one or more network management protocols designed for management of configuration data within the managed network elements 114, such as the SNMP protocol or the Network Configuration Protocol (NETCONF) protocol, or a derivative thereof, such as the Juniper Device Management Interface, to perform the configuration. The controller device 10 may establish NETCONF sessions with one or more of the elements 114.

Controller device 110 may be configured to compare a new intent data model to an existing (or old) intent data model, determine differences between the new and existing intent data models, and apply the reactive mappers to the differences between the new and old intent data models. In particular, the controller device 110 determines whether the new data model includes any additional configuration parameters relative to the old intent data model, as well as whether the new data model modifies or omits any configuration parameters that were included in the old intent data model.

The intent data model may be a unified graph model, while the low-level configuration data may be expressed in YANG, which is described in (i) Bjorklund, "YANG—A Data Modeling Language for the Network Configuration Protocol (NETCONF)," Internet Engineering Task Force, RFC 6020, October 2010, available at tools.ietf.org/html/rfc6020, and (ii) Clemm et al., "A YANG Data Model for Network Topologies," Internet Engineering Task Force, RFC 8345, March 2018, available at tools.ietf org/html/rfc8345 (sometimes referred to as "RFC 8345"). In some examples, the intent data model may be expressed in YAML Ain't Markup Language (YAML). Controller device 10 may include various reactive mappers for translating the intent data model differences. These functions are configured to accept the intent data model (which may be expressed as structured input parameters, e.g., according to YANG or YAML). The functions are also configured to output respective sets of low-level device configuration data model changes, e.g., device configuration additions and removals. That is, y1=f1(x), y2=f2(x), . . . yN=fN(x).

The controller device 110 may use YANG modeling for intent data model and low-level device configuration models. This data may contain relations across YANG entities, such as list items and containers. As discussed in greater detail below, the controller device 110 may convert a YANG data model into a graph data model, and convert YANG validations into data validations. Techniques for managing network devices using a graph model for high level configuration data is described in "CONFIGURING AND MANAGING NETWORK DEVICES USING PROGRAM OVERLAY ON YANG-BASED GRAPH DATABASE," U.S. patent application Ser. No. 15/462,465, filed on 17 Mar. 2017, the entire content of which is incorporated herein by reference.

Controller device 110 may receive data from any of administrators 112 representing any or all of create, update, and/or delete actions with respect to the unified intent data model. The controller device 110 may be configured to use the same compilation logic for each of create, update, and delete as applied to the graph model.

In general, controllers, such as controller device 110, use a hierarchical data model for intents, low-level data models, and resources. The hierarchical data model can be based on YANG or YAML. The hierarchical data model can be represented as a graph, as discussed above. Modern systems have supported intents to ease the management of networks. Intents are declarative. To realize intents, the controller device 110 attempts to select optimal resources.

In accordance with aspects of this disclosure, controller device 110 implements a programmable diagnosis model that facilitates RCA when one or more of the network elements 114 exhibits a failure (e.g., packet loss, or other failure). The programmable diagnosis model constructs the network resources and inter-resource dependencies in the form of a resource definition graph. The resource definition graph is a construct that can be programmed, in such a way that it specifies a set of objects (resources) which include: (i) attributes(s); (ii) state(s); and (iii) links to other object(s) (resource(s). A particular instance of a resource definition graph defines the relationships that characterize a particular corresponding network context, which can be a network domain, a network device, a network service, etc. The programmable diagnosis service 224 discovers resources (instances) based on the constructed resource definition graph.

Figure 2:
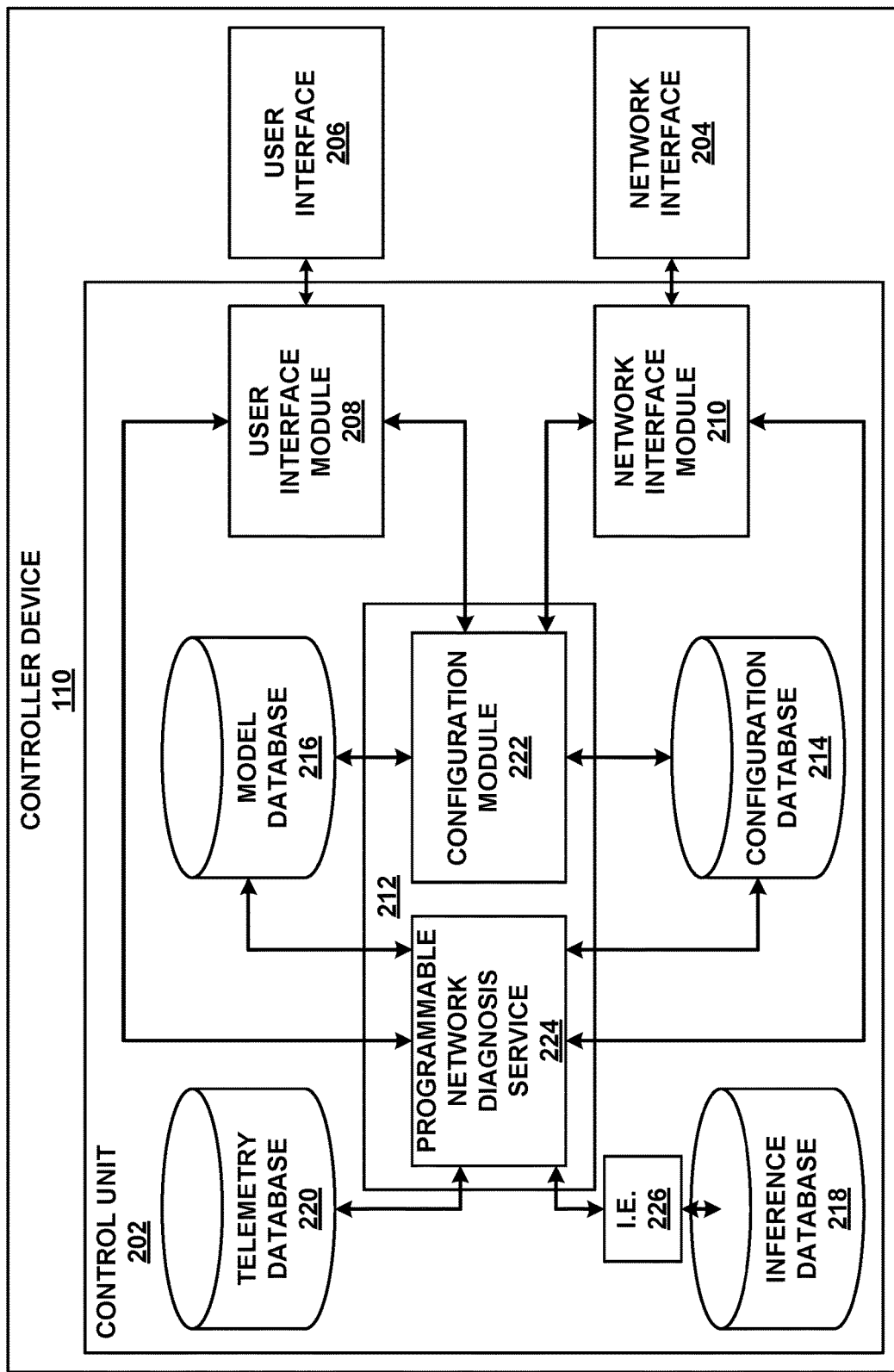
FIG. 2 is a block diagram illustrating an example set of components for the controller device of FIG. 1.

FIG. 2 is a block diagram illustrating an example set of components for controller device 110 of FIG. 1. In this example, controller device 110 includes control unit 202, network interface 204, and user interface 206. The network interface 204 represents an example interface that can communicatively couple the controller device 100 to an external device, e.g., one of the elements 114 of FIG. 1. The network interface 204 may represent a wireless and/or wired interface, e.g., an Ethernet® interface or a wireless radio configured to communicate according to a wireless standard, such as one or more of the IEEE 802.11 wireless networking protocols (such as 802.11 a/b/g/n or other such wireless protocols). Controller device 110 may include multiple network interfaces in various examples, although only one network interface is illustrated in the non-limiting example of FIG. 2.

Control unit 202 represents any combination of hardware, hardware implementing software, and/or firmware for implementing the functionality attributed to the control unit 202 and its constituent modules and elements. When control unit 202 incorporates software or firmware, control unit 202 further includes any necessary hardware for storing and executing the software or firmware, such as one or more processors or processing units. In general, a processing unit may include one or more microprocessors, digital signal processors (DSPs), application specific integrated circuits (ASICs), field programmable gate arrays (FPGAs), fixed function circuitry, programmable processing circuitry, or any other equivalent integrated or discrete logic circuitry, as well as any combinations of such components. A processing unit is generally implemented using fixed and/or programmable logic circuitry.

User interface 206 represents one or more interfaces by which a user, such as the administrators 112 of FIG. 1, interacts with the controller device 110, e.g., to provide input and receive output. For example, the user interface 206 may represent one or more of a monitor, keyboard, mouse, touchscreen, touchpad, trackpad, speakers, camera, microphone, or the like. Furthermore, although in this example the controller device 100 includes a user interface 206, the administrators 112 need not directly interact with the controller device 100, but instead may access the controller device 100 remotely, e.g., via the network interface 204.

Functionality of the control unit 202 may be implemented as one or more processing units in fixed or programmable digital logic circuitry. Such digital logic circuitry may include one or more microprocessors, digital signal processors (DSPs), application specific integrated circuits (ASICs), fixed function circuitry, programmable logic circuitry, field programmable gate arrays (FPGAs), or any other equivalent integrated or discrete logic circuitry, as well as any combination of such components. When implemented as programmable logic circuitry, the control unit 202 may further include one or more computer readable storage media storing hardware or firmware instructions to be executed by processing unit(s) of control unit 202.

In this example, control unit 202 includes a user interface module 208, network interface module 210, and management module 212. Control unit 202 executes user interface module 208 to receive input from and/or provide output via user interface 206. Control unit 202 also executes network interface module 210 to send and receive data (e.g., in packetized form) via network interface 204. The user interface module 208, the network interface module 210, and the management module 212 may again be implemented as respective hardware units, or in software or firmware implemented by appropriate hardware infrastructure, or a combination thereof.

The control unit 202 executes a management module 212 to manage various network devices, e.g., the elements 114 of FIG. 1. Management includes, for example, configuring the network devices according to instructions received from a user (e.g., the administrators 112 of FIG. 1) and providing the user with the ability to submit instructions to configure the network devices. The management module 212 accesses various databases, such as a configuration database 214, a model database 216, an inference database 218 and a telemetry database 220, that store data to assist in managing the various network devices. While the databases 214-220 are illustrated as separate databases, one or more of these databases 214-220 may be combined or otherwise rearranged. In this example, the management module 212 further includes a configuration module 222 and programmable diagnosis service 224.

The management module 212 is configured to receive intent unified-graph-modeled configuration data for a set of managed network devices from a user, such as the administrators 112. Such intent unified-graph-modeled configuration data may be referred to as an "intent data model." Over time, the user may update the configuration data, e.g., to add new services, remove existing services, or modify existing services performed by the managed devices. The unified intent data model may be structured according to, e.g., YANG or YAML. The graph model may include a plurality of vertices connected by edges in a hierarchical fashion. In YANG, edges of graph models are represented though "leafref" elements. In the case of YAML, such edges may be represented with a "ref" edge. Similarly, parent-to-child vertex relations can be represented with a "has" edge. For example, a vertex for Element A refers to a vertex for Element B using a has-edge can be understood to mean, "Element A has Element B."

The configuration database 214 generally includes information describing the managed network devices, e.g., the elements 114. The configuration database 214 may include information indicating device identifiers (such as MAC and/or IP addresses), device type, device vendor, devices species (e.g., router, switch, bridge, hub, etc.), or the like. The configuration database 214 also stores current configuration information (e.g., intent data model, or in some cases, both intent data model and low-level configuration information) for the managed devices (e.g., the elements 114).

The model database 216 includes the models configured by a user, via the configuration module 222, that describe the structure of the network 102. As described below, the model database includes a network aware diagnosis model that is used by programmable diagnosis service 224 to perform root cause analysis to find the malfunctioning element 114 that is a source of an event even when the malfunction is not the direct/immediate result of the event, but instead, a cascading downstream effect of the event.

Figure 3:
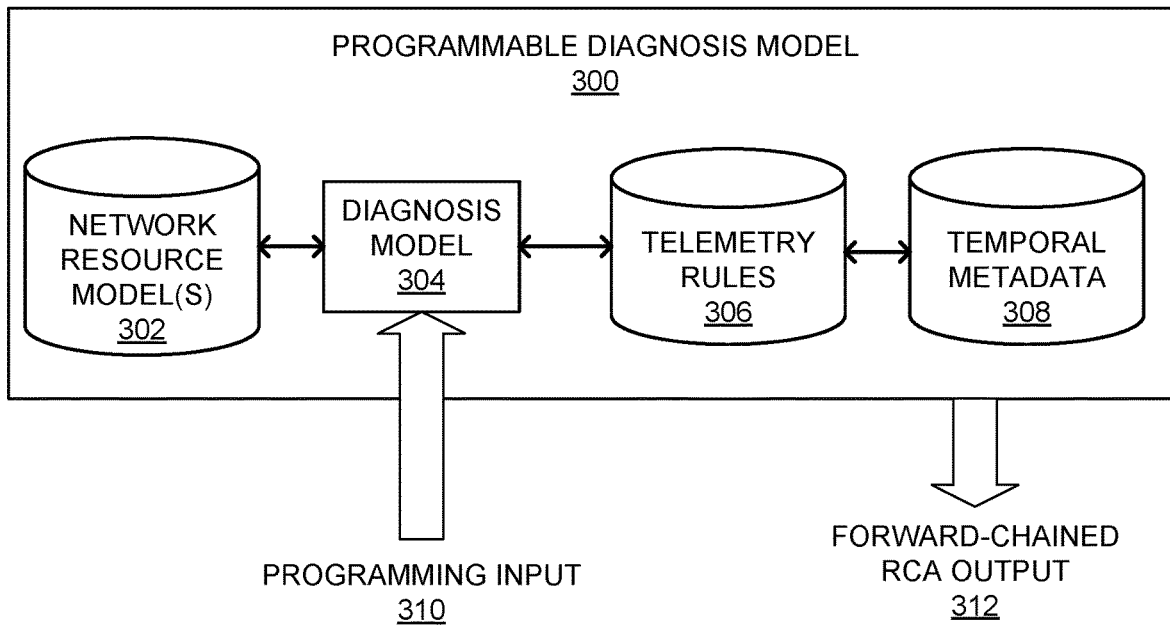
FIG. 3 is conceptual diagram illustrating components of an example programmable diagnosis model which may be implemented by a controller device, such as the controller device of FIGS. 1 and 2

FIG. 3 is conceptual diagram illustrating components of an example programmable diagnosis model 300, which may be implemented by a controller device, such as the controller device 10. The programmable diagnosis model 300 models the network from multiple perspectives to be usable with networks with frequently changing topologies and support multiple concurrent faults at a time. In the illustrated example, the programmable diagnosis model 300 includes network resource model(s) 302, a diagnosis model 304, telemetry rules 306, and temporal metadata 308. The network resource model(s) 302 include service resource model(s) and device resource model(s), and define inter-resource dependencies. The telemetry rules 306 provide data that that enables the controller device 110 to monitor the state of one or more components in network 102. The telemetry rules 306 also enable the controller device 110 to generate or instigate alarms based on detecting thresholds configured in network 102. In some examples, the telemetry rules 306 may be included in a network resource model that also includes a network model (as described in U.S. patent application Ser. No. 16/731,372) for network 102 and device model information for device elements of elements 114.

The diagnosis model 304 captures the cause and effect (sometime referred to herein as "correlations") relationship between various resources. For example, the diagnosis model 304 may reflect cause-and-effect relationships across events that occur over network 102. The cause and effect relationships are defined between resources and resource alarms/events. When the cause and effect relationship is defined between resources, any critical alarm/event on a resource causes an effect on "supporting resources." When the cause and effect relationship is defined between resource alarms/events, an event on a resource causes an effect on a "supported resource" events.

The programmable diagnosis model 300 is used by the programmable diagnosis service 224 to perform forward-chained RCA in accordance with aspects of this disclosure. To aid in identifying the root cause of a fault or other event while accommodating dynamic changes in the topology of network 102, the programmable diagnosis model 300 enables administrators to update aspects of the diagnosis model 304 by providing programming input 310 via the controller device 110. The programmable diagnosis service 224 uses the programming input 310 to construct a resource definition graph that models network resources and interdependencies therebetween. Based on the model constructed in this way, programmable diagnosis service 224 discovers the resources from network 102 and build the relations across the discovered resources.

Individual vertices of the resource definition graph include one or more "playbooks" that define respective telemetry rule(s) that enables the programmable diagnosis service 224 to fetch state information from network 102. The resource definition graph constructed by the programmable diagnosis service 224 captures both network model and device model information, as well as corresponding rules of the telemetry rules 306. The resource definition graph also includes the diagnosis model 304, which provides cause and effect relationship information across events detected within network 102. A given vertex of the resource definition graph (including resource model information along with telemetry rule information) enables the programmable diagnosis service 224 to discover network and device resource instances of each object that exist on network 102, to collect the data required to fill and update the value of the object attributes, and to compute the actual value of the "state" attributes defined.

The programmable diagnosis model 300 also includes temporal metadata 308. The temporal metadata 308 includes information describing timing information of events detected among the elements 114 of the network 102. The temporal metadata 308 may include exact times, approximate times, or relative times measured with respect to discrete events detected within the network 102. Based on criteria provided in the programming input 310 or based on other criteria, the programmable diagnosis service 224 may apply the portions of the temporal metadata 308 that apply to potentially interrelated events to perform RCA with respect to a downstream event. In one example, the programmable diagnosis service may retain or eliminate an event as a possible upstream cause based on whether or not the event occurred within a threshold time frame of causality with respect to the downstream event.

Using the combination of the network resource model(s) 302, the diagnosis model 304 formed or updated with the programming input 310, the telemetry rules 306, and the temporal metadata 308, the programmable diagnosis service 224 forms one or more of the inference rules stored to the inference database 218. In turn, the programmable diagnosis service 224 applies those inference rules of the inference database 218 that are applicable to the particular event under RCA to run the programmable diagnosis model 300. The output produced by running the programmable diagnosis model 300 is shown in FIG. 3 as forward-chained RCA output 312.

More specifically, the programmable diagnosis service 224 uses the programmed model (a version of diagnosis model 304 formed using programming input 310) to automatically derive the relevant inference rules of the inference database 218. In accordance with aspects of this disclosure, the inference rules stored to the inference database 218 are subject to one or more temporal constraints, which are described in greater detail below with respect to the application of temporal metadata. The programmable diagnosis service 224 applies the derived inference rules to identify the source of the fault under RCA. The inference engine 226 maintains the event under RCA in cache memory for a predetermined time interval, and generates an inference upon receiving a dependent event. Upon correlating the events, the inference engine 226 generates a smart event with an RCA tree and a root cause event to be output as part of forward-chained RCA output 312. In some examples, the programmable diagnosis service 224 save the forward-chained RCA output 312 to an analytics database which may be implemented locally at the controller device 110, at a remote location, or in a distributed manner.

Figure 4:
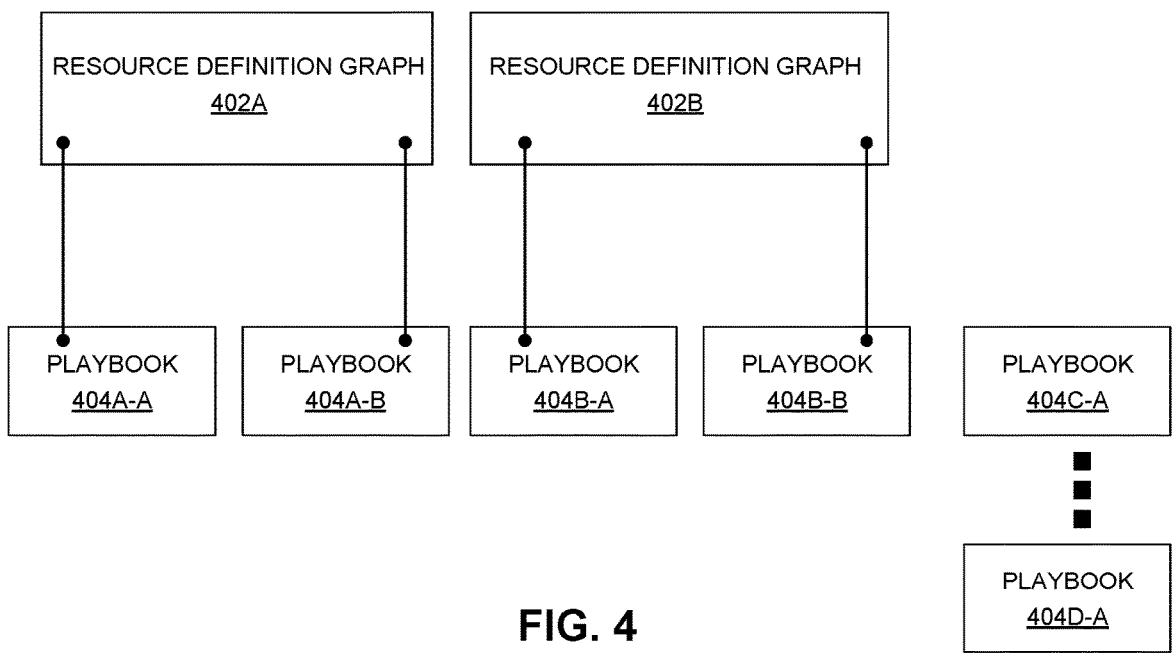
FIG. 4 is conceptual diagram illustrating resource definition graphs of this disclosure.

FIG. 4 is a conceptual diagram illustrating resource definition graphs 402A and 402B of this disclosure. Each of resource definition graphs 402A and 402B (collectively, "resource definition graphs 402") models network resources and dependencies between the resources of the respective resource definition graph. Each of resource definition graphs 402 is a construct that is formed by modifying programmable diagnosis model 300 using programming input 310. Each of resource definition graphs 402 specifies a set of resource models which contain one or more attributes, and/or one or more state(s), and/or one or more links to other resource models. Each of resource definition graphs 402 defines a set of relationships in a resource model that characterize a certain network context, which can be any of a network domain, can be a network device, a network service, etc.

In the example of FIG. 4, resource definition graph 402A is associated with playbooks 404A-A and 404A-B (collectively, "playbooks 404A"), and resource definition graph 402B is associated with playbooks 404B-A and 404B-B (collectively, "playbooks 404B"). Each of playbooks 404 defines those of telemetry rules 306 that enable programmable diagnosis service 224 to fetch state information from network 102. Each of resource definition graphs 402 captures network model and device model information, as well as the corresponding rules of telemetry rules 306.

Figure 5:
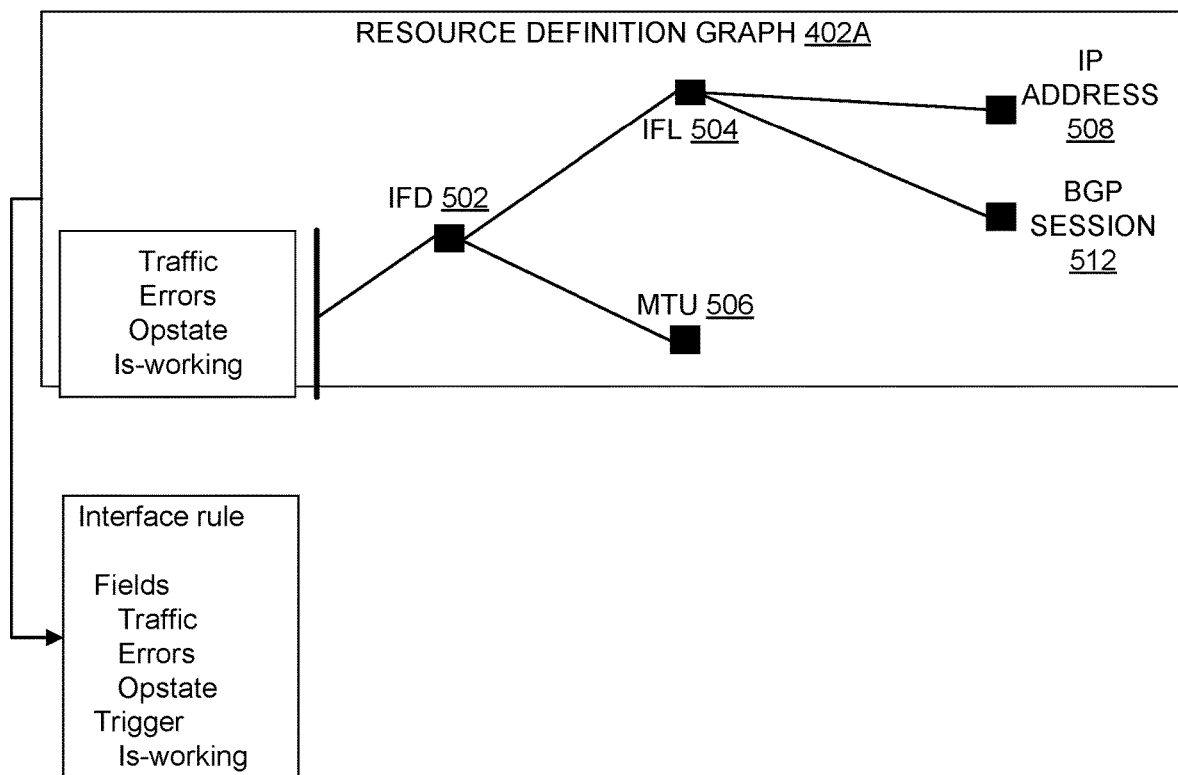
FIG. 5 is a conceptual diagram illustrating an example of a resource definition graph illustrated in FIG. 4.

FIG. 5 is a conceptual diagram illustrating an example of resource definition graph 402A of FIG. 4. Resource definition graph 402A is a static graph, in that resource definition graph 402 includes definitions of object types (and not individual instances of the objects) of network 102. Resource definition graph 402A is also pluggable, in that it provides scalability and support for the programmability to integrate new service models. In the example of FIG. 5, resource definition graph 402A defines relationships between various object models, namely, a physical device (IFD 502), a logical device (IFL 504), and a maximum transmission unit size supported by the interface (MTU) 506, an internet protocol (IP) address 508, and a border gateway protocol (BGP) session 512. The inter-object links shown within resource definition graph 402A may include one or more unidirectional relationships and/or one or more bidirectional relationships.

Resource definition graph 402A captures network model information, device model information, and corresponding telemetry rules for the resources shown. Using the information available from resource definition graph 402A, controller device 110 may discover the various instances of the objects described in resource definition graph 402A included in a particular device group of network 102. Based on the causality link between IFD 502 and IFL 504, controller device 110 may determine that a fault occurring at IFD 502 potentially affects the functioning of IFL 504. Based on the causality link, programmable diagnosis service 224 may include IFD 502 in the discovery process with respect to fault investigation for IFL 504. In this way, programmable diagnosis service 224 may obtain object properties and service properties for the device group under discovery based on the causality links included in resource definition graph 402A.

In examples in which IFD 502 has multiple interfaces, programmable diagnosis service 224 may run programmable diagnosis model 300 to derive an inference rule that associates the particular interface of IFD 502 with the dependent event (e.g., packet loss or other fault) occurring at IFL 504. Programmable diagnosis service 224 further tunes the inference rule using one or more temporal constraints formed based on temporal metadata 308. If the fault discovered at IFL 504 fits the temporally compliant inference rule, programmable diagnosis service 224 generates forward-chained RCA output to identify the fault at IFD 502 as either the root cause or as an intermediate cause (which leads to the root cause) of the fault discovered at IFL 504.

To obtain forward-chained RCA output 312, programmable diagnosis service 224 may use diagnosis model 304 (formed or modified using programming input 310) to automatically derive the relevant inference rules of inference database 218. Again, programmable diagnosis service 224 may derive the inference rules to comport with temporal constraints for causality as derived from temporal metadata 308. In turn, programmable diagnosis service 224 uses the inference rules stored to inference database 218 to identify the source of the detected event (e.g. fault). Inference engine 226 may maintain an event in cache storage for a specified time interval and generate an inference when a potentially dependent (e.g., downstream effect) event arrives. Upon generating an event correlation, programmable diagnosis service 224 may generate a "smart event" with an RCA tree and an identified root cause event. Programmable diagnosis service 224 stores the smart event and the identified root cause event to an analytics database that may be implemented locally at controller device 110, at a remote location, or in a distributed manner.

Figure 6:
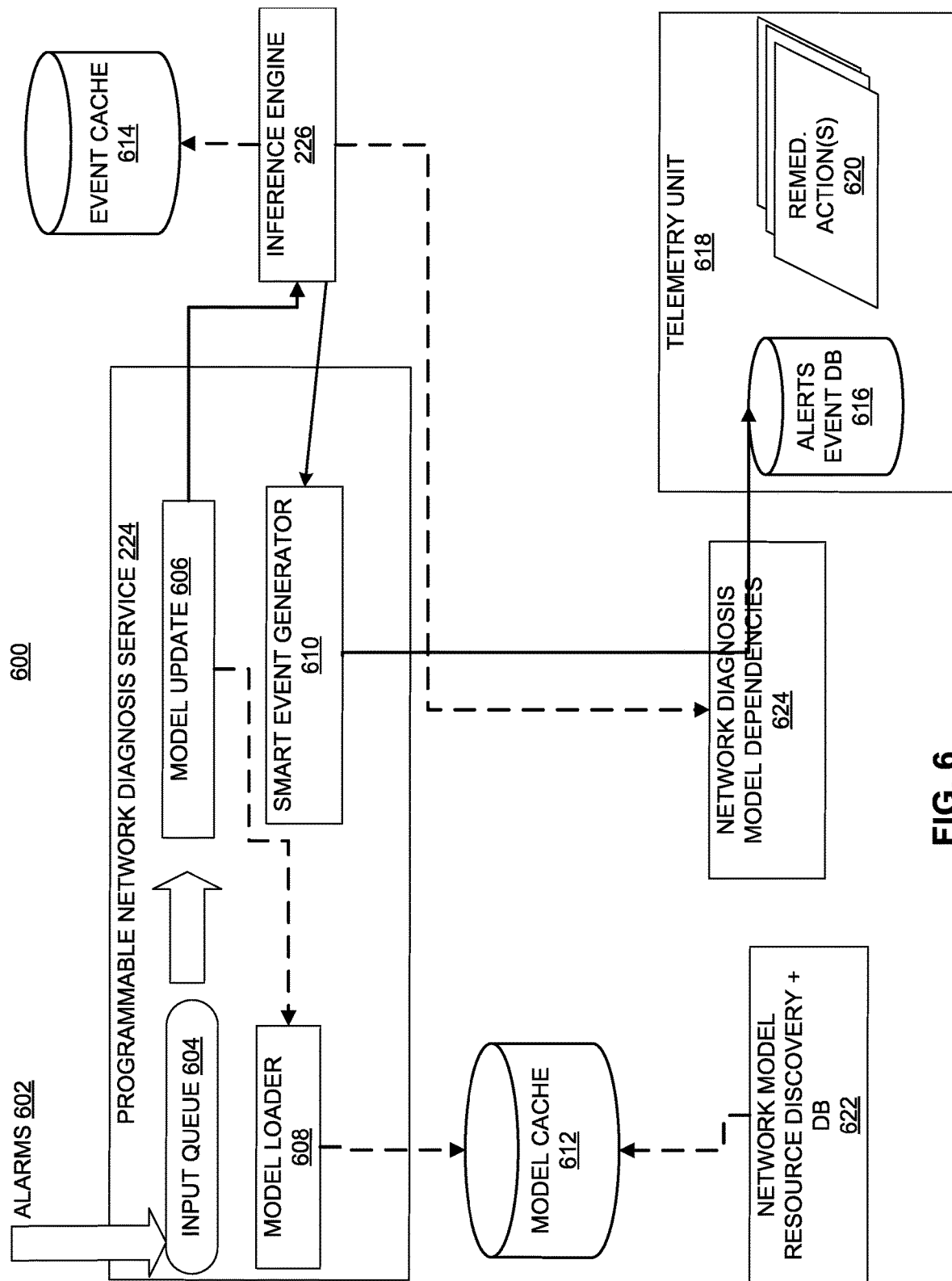
FIG. 6 is a conceptual diagram illustrating an example system in which the programmable network diagnosis techniques of this disclosure are performed.

FIG. 6 is a conceptual diagram illustrating system 600 in which the programmable network diagnosis techniques of this disclosure are performed. Programmable diagnosis service 224 may receive one or more alarms 602, and process alarms 602 in first-in-first-out (FIFO) manner via input queue 604. Upon the resource definition graph being programmed, system 600 discovers the resources over network 102. Programmable network diagnosis service loads these resource instances to model cache 612. Model update 606 of system 600 represents a step in which system 600 decorates the events with additional information through model loader 608. Programmable diagnosis service 224 also includes smart event generator 610 that is configured to generate alerts based on inferences output by inference engine 226 reflecting a correlation between different events captured from a device group of network 102. Smart event generator 610 may store the alerts to alerts event database 616 of telemetry unit 618. In turn, telemetry unit 618 may trigger one or more remediation actions 620 in response to new alerts being pushed to alerts event database 616. Telemetry unit 618 draws on telemetry rules 306 and playbooks 404 to formulate and/or select from remediation action(s) 620.

More specifically, to generate the alerts stored to alerts event database 616, smart event generator 610 uses inference rules formulated by inference engine 226. Inference engine 226 also stores events received from the programmable network diagnosis service 224 to event cache 614. Inference engine 226 implements a knowledge-based generation mechanism with respect to the inference rules stored to inference database 218.

Figure 7:
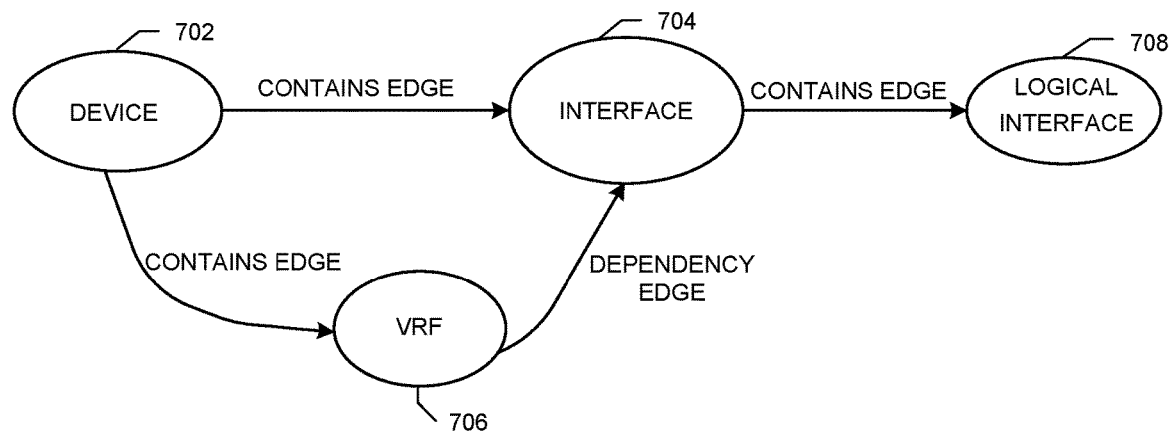
FIG. 7 is a conceptual diagram illustrating a model that the programmable diagnosis service of this disclosure may generate with respect to a device or device group of the network illustrated in FIG. 1.

FIG. 7 is a conceptual diagram illustrating a model 700 that programmable diagnosis service 224 may generate with respect to a device or device group of network 102. Upon creation of model 700, programmable diagnosis service 224 may associate model with a device or device group of network 102. In turn, controller device 110 may internally invoke discovery and populate model 700 via resource discovery. Resource information may be loaded from other controllers or discovered from network 102.

At a high level, model 700 may capture the following: (i) a resource model for network and device resources; (ii) resource dependencies; (including (a) parent and child resources and (b) unidirectional and bidirectional dependencies); (iii) cause and effect dependencies between resource events; and (iv) a mapping of a telemetry playbook to model 700. As shown in FIG. 7, model 700 includes two types of edges. One type of edge included in model 700 is a "contains" edge (or "has" edge), which denotes a parent-child relationship between resources. The other type of edge included in model 700 is a "dependency" edge, which denotes a dependency relationship between resources. Both of these edge types shown in model 700 create cause-and-effect relationship between resources.

In the example of FIG. 7, device 702 includes an interface 704, which in turn includes a logical interface 708. These nested parent-child relationships are denoted by consecutive "contains" edges in FIG. 7. Device 702 also includes a VRF, which is shown by way of a contains edge drawn directly from device 702 to VRF 706 in FIG. 7. Downstream fault propagation occurs automatically from parent to child by way of contains edges, and therefore, programmable diagnosis service 224 automatically derives inference rules that link faults upstream via each contains edge shown in FIG. 7. Said another way, child nodes inherit faults from upstream parent, grandparent, or ancestor nodes via contains edges or chains composed of serial contains edges. VRF 706 is also linked to interface 704 by way of a dependency edge, and therefore, programmable diagnosis service automatically derives inference rules linking faults between VRF 706 and interface 704 (in a unidirectional way in the particular example of model 700).

YANG code for a data model corresponding to model 700 is presented below:

```
module: resource
augment /topic:
+--rw resource* [resource-key]
   +--rw resource-key string
   +--rw parent-resource? string
   +--rw description? string
   +--rw resource-field* [field-name]
   |  +--rw field-name string
   |  +--rw type? enumeration
   |  +--rw description? string
   |  +--rw value? string
   +--rw state* [state-name]
   |  +--rw state-name string
   |  +--rw description? string
   |  +--rw status? string
   +--rw rules* [rule-name]
   |  +--rw rule-name string
   |  +--rw fields* [rule-field resource-field]
   |  |  +--rw rule-field string
   |  |  +--rw resource-field string
   |  +--rw triggers* [trigger-state resource-state]
   |  +--rw trigger-state string
   |  +--rw resource-state string
   +--rw dependent-resource* [dependent-resource-name]
      +--rw resource-name -> ../../resource-key
      +--rw description? string
      +--rw rules* [rule-name]
      |  +--rw rule-name string
      |  +--rw fields* [rule-field resource-field]
      |  |  +--rw rule-field string
      |  |  +--rw resource-field string
      |  +--rw triggers* [trigger-state resource-state]
      |  +--rw trigger-state string
      |  +--rw resource-state string
      +--rw dependency* [cause effect]
         +--rw cause string
         +--rw effect string
```

The YANG data model above includes various constructs. Resource fields define attributes of the corresponding resource. State fields define operational states of the corresponding resource. Dependencies capture inter-resource dependencies. Resource-rule mapping fields capture mappings between the resource field and the rule field, along with triggers to the resource state mapping.

A YANG model corresponding to the YANG code above is presented below:

```
module resource {
   namespace "http:// yang/ resource";
   prefix " resource";
   augment "/topic" {
      uses resource-model-group;
   }
grouping cause-effect-event-dependency-group {
   list dependency {
      key "cause effect";
      leaf cause {
         type string {
            pattern
               "[a-z][a-zA-Z0-9_-]*";
         }
         description
            "Causer event";
      }
      leaf effect {
         type string {
            pattern
               "[a-z][a-zA-Z0-9_-]*";
         }
         description
            "Impacted event";
      }
   }
}
grouping resource-model-group {
   list resource {
      key resource-key;
      leaf resource-key {
         type string {
            length "1..64";
            pattern
               "[a-z][a-z0-9_-]*";
         }
         description
            "Key of the resource. Should be of pattern [a-z][a-z0-9_-]*";
      }
      leaf parent-resource {
         type string {
            length "1..64";
            pattern
               "[a-z][a-z0-9_-]*";
         }
         description
            "Parent of the resource. Should be of pattern [a-z][a-z0-9_-]*";
      }
      leaf description {
         type string;
         description
            "Description about the rule";
      }
      uses resource-fields-group;
      uses state-group;
      uses rule-mapping-group;
      uses dependency-group;
   }
}
grouping resource-fields-group {
   list resource-field {
      key field-name;
      leaf field-name {
         type string {
            length "1..64";
            pattern
               "[a-z][a-zA-Z0-9_-]*";
         }
         description
            "Name of the field. Should be of pattern [a-z][a-zA-Z0-9_-]*"
      }
      leaf type {
         type enumeration {
            enum string;
            enum integer;
            enum float;
         }
      }
      leaf description {
         type string;
         description
```

```
          "Description about this field";
       }
       leaf value {
          type string;
          description
             "value for the field";
       }
    }
}
grouping state-group {
   list state {
      key state-name;
      leaf state-name {
         type string {
            length "1..64";
            pattern
               "[a-z][a-z0-9_-]*";
         }
         description
            "Resource state name. Should be of pattern
            [a-zA-Z][a-zA-Z0-9_-]*";
      }
      leaf description {
         type string;
         description
            "Description about the resource state";
      }
      leaf status {
         type string;
      }
   }
}
grouping field-mapping-group {
   leaf rule-field {
      description
         "field in rule";
      type string;
   }
   leaf resource-field {
      description
         "field in resource, this can be jinja template leveraging the
         attributes in Resource";
      type string;
   }
}
grouping trigger-mapping-group {
   leaf trigger-state {
      description
      "maps to trigger in rule";
      type string;
   }
   leaf resource-state {
      description
      "operational state of resource";
      type string;
   }
}
grouping dependency-group {
   list dependent-resource {
      description
      "dependent resource name";
      key "dependent-resource-name";
      leaf dependent-resource-name {
         type leafref {
            path "../../resource-key";
         }
         description
         "Name of the dependency resource. Should be of pattern
         [a-zA-Z][a-zA-Z0-9_-]*";
      }
      leaf description {
         type string;
         description
         "Description about the dependency";
      }
      uses rule-mapping-group;
      uses cause-effect-event-dependency-group;
   }
}
```

```
grouping rule-mapping-group {
   list rules {
      key rule-name;
      leaf rule-name {
         type string;
         description
            "Rules that needs to be triggered";
      }
   }
   list fields {
      key "rule-field resource-field";
      uses field-mapping-group;
   }
   list triggers {
      key "trigger-state resource-state";
      uses trigger-mapping-group;
   }
}
```

Descriptions for various data model fields are presented below in Table 1.

TABLE 1

| Data Model | Description |
| --- | --- |
| Resource | Resource in network |
| Resource fields | Attributes of resource |
| Resource state | Operational state of resource |
| Resource dependencies | Captures dependency between resources. It also includes a set of rules that need to be triggered when the dependent resource is also present. |
| Resource-rule mapping | Holds the resource to rule mapping. This captures the resource field to rule field mapping along with triggers to resource state mapping. |

Based on the association of resources, programmable diagnosis service 224 may apply configuration information model 700. Programmable diagnosis service 224 may collect additional state information based on a service association to a resource. To collect the additional state information, programmable diagnosis service 224 may apply additional telemetry rules (e.g., telemetry rules 306 or other telemetry rules) based on service-to-resource associations. For example, a VPN service associated interface may require additional telemetry rule(s) run on the associated interface. The application of this telemetry rule is given as below:

```
node vrf {
   dependent-resource :{
      resource-name :interface;
      rule : interface-status.rule;
   }
}
```

Execution of the code above will add "interface-status.rule" to interfaces that are associated to resource "VRF."

Figure 8:
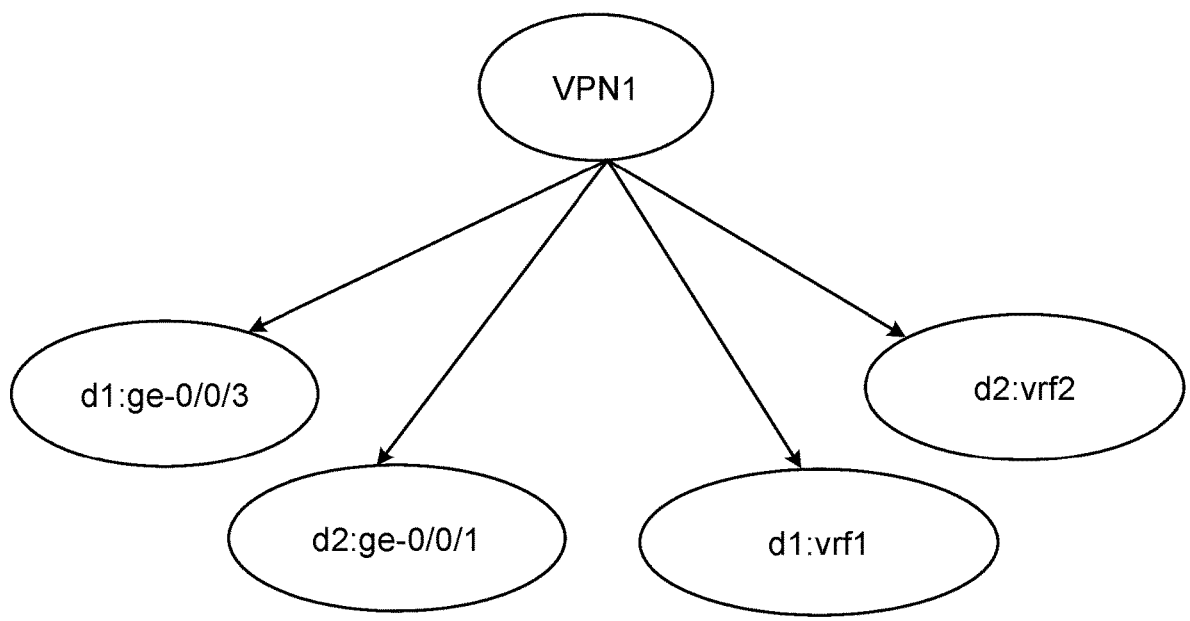
FIG. 8 is a conceptual diagram illustrating an example model update that the programmable diagnosis service of FIG. 2 may implement, in accordance with aspects of this disclosure.

FIG. 8 is a conceptual diagram illustrating an example model update 800 that programmable diagnosis service 224 may implement, in accordance with aspects of this disclosure.

Model update 800 may be described as "network model decoration" or "event decoration" with respect to events with a network model under diagnosis, in accordance with aspects of this disclosure. An analytics engine operated by controller device 110 may capture a stream of events captured from network 110 and feed the event stream into the programmable diagnosis service 224. Model update 606 may decorate every event with model dependency information.

The analytics engine may collect certain state information based on service associations. For example, if a VPN is associated with a particular interface, the analytics engine may fetch state information for that interface. Programmable diagnosis service may execute an interface status rule if there is an association between a VPN instance to an interface instance. "VPN1" shown in model 800 is such a VPN instance. In the case of model 800, model update 606 may decorate device events will be with "vpn1 instance" information. In the case of the events shown in FIG. 8 (namely, d1:ge-0/0/3 down, d2:VRF2 packet loss), model update 606 adds model information as below:

Event(id=d1:ge-0/0/3, type=INTERFACE DOWN,referrers=[vpn:vpn1])

Event(id=d2:VRF2, type=VRF PACKET LOSS, referrers=[vpn:vpn1])

In turn, inference engine 226 operates on the event stream processed according to the network model with upstream dependencies (to the VPN1 instance in the case of FIG. 8).

Programmable diagnosis service 224 constructs a diagnosis dependency model that captures cause-and-effect relationships across various resources in a device group of network 102. Programmable diagnosis service 224 may include various types of cause-and-effect relationships in the diagnosis dependency model, such as cause-and-effect relationships between resources and/or cause-and-effect relationships between resource alarms/events. If a cause-and-effect relationship is between resources, any critical alarm/event on a resource can cause an effect on "supported resources". That is, a user may provide, as part of programming input 310, a dependency definition linking an event on one resource to a causal event on another resource. If a cause-and-effect relationship is between resource alarms/events, an event detected on a resource can cause an effect on a supported resource event.

Dependency and contains edges introduce cause-and-effect relationships between the resources in the diagnosis dependency model. Dependencies between resource alarms are shown in the code below:

```
rw dependency* [dependent-resource-name]
  +--rw resource-name -> ../../resource-key
  +--rw description? string
  +--rw rules* [rule-name]
  | +--rw rule-name string
  | +--rw fields* [rule-field resource-field]
  | | +--rw rule-field string
  | | +--rw resource-field string
  | +--rw triggers* [trigger-state resource-state]
  |   +--rw trigger-state string
  |   +--rw resource-state string
  + --rw dependency* [cause effect]
```

```
  +--rw cause string
  +--rw effect string
```

Inference engine 226 represents an expert system that can be described as a form of finite state machine with a cycle consisting of three action states. The three action states are "match rules," "select rules," and "execute rules." Inference engine 226 may apply rules on set of facts that are active in memory. Inference engine 226 may requires facts upon which to operate. Inference engine 226 runs a fact model that captures network event information. The fact model is denoted by:

```
class Event {
  string id;
  string type;
  String refferList;
}
```

As described above, programmable diagnosis service 224 generates temporally based inference rules by applying temporal metadata 308. That is, inference engine 226 applies temporal metadata 308 to generate all of the inference rules stored to inference database 218 with temporal constraints. The techniques of this disclosure are based on a realization that temporal relations are important in handling relationships between network events. Without applying temporal constraints, event correlation may include inaccuracies because of the time elapsed being events being disregarded. Because timing information for events are relative to each other, a purely date/time representation without relative timing deltas may be insufficient with respect to applying temporal constraints to improve the accuracy of RCA. Two example temporal operators are "before" and "after" operators. For instance, in the example of model 800, the "ge-0/0/3 interface down" event happened before the VRF1 packet loss event.

Based on the dependency model created for resources of network 102, inference engine 226 auto-generates inference rules to be stored to inference database 218. Inference engine 226 uses a rule template that accepts, as input, the cause-and-effect dependencies (defined in the network resource model) and generates the inference rules based on these cause-and-effect dependencies. Inference engine 226 generates the templates to account for causal and consequent events to be detected in any order, such as the consequent event being detected after the causal event (expected), or the consequent ("target") event being detected before the causal event (unexpected). In some examples, the causal event may be detected after the target event because of latency or other system constraints. For instance, an interface down event may cause VPN packet loss, but the packet loss may be detected before or after the interface down event is detected, in different use case scenarios. Inference engine 226 may generate the rule template to accommodate both scenarios. Inference engine 226 may assign a different inference rule to each of these scenarios. Rule template generation is shown by way of example in the code below, in which {{source event type}}, {{target event type}} are template variables:

```
declare Event
  @expires( 7d )
End
rule 'Dependency Rule - if cause event occurs before effect in stream'
when
  $effect_event: Event(type== {{target_event_type}} )
```

```
    $cause : Event( this before[0, 7d] $effect_event, type== {{source_event_type}} )
    $effect: Event(id == $effect_event.getId( ), $cause.get RefferList ( ) contains
    $effect_event.getId( ))
then
    Inference $inference = Inference( );
    $inference.setCause($cause.getId( ));
    $inference.updateEffects($effect.getId( ));
    TreeNode<String> root = new TreeNode<String>($cause.getId( ));
    root.name = $cause.getType( );
    TreeNode<String> child = root.addChild($effect.getId( ));
    child.name = $effect.getType( );
    $inference.setHierarchy(root);
    insert($inference);
end
rule 'Dependency Rule - if target event occurs before cause in stream'
when
    $cause_event: Event(type== {{source_event_type}} )
    $effect : Event( this before[0, 7d] $cause_event, type== {{target_event_type}} )
    $cause: Event(id==$cause_event.getId( ), $cause_event.getBackrefs( ) contains
    $effect.getId( ))
then
    Inference $inference = Inference( );
    $inference.setCause($cause.getId( ));
    $inference.updateEffects($effect.getId( ));
    TreeNode<String> root = new TreeNode<String>($cause.getId( ));
    root.name = $cause.getType( );
    TreeNode<String> child = root.addChild($effect.getId( ));
    child.name = $effect.getType( );
    $inference.setHierarchy(root);
    insert($inference);
end
```

Programmable diagnosis service 224 performs RCA based on inferences through forward chaining, in accordance with the techniques of this disclosure. As used herein, forward chaining is the logical process of inferring unknown truths from known data, and moving forward using determined conditions and rules to identify a solution. A generic example, based on transitive properties can be stated as "if 'a' causes 'b' and 'b' causes 'c', then 'a' is the root cause of 'c'." As part of inference formation, programmable diagnosis service 224: (i) merges the causes and effects and causes based on the generated inferences to form one or more inference rules; and (ii) generates an RCA tree (which can be represented as a graph of related events) as part of a chaining process.

Inference engine 226 may persist the RCA tree in event cache 614 (or another event DB) for further event analysis.

Inference engine 226 generates an inference model that captures the inferred information from the events stored to event cache 614. The inference model contains causes and a list of effects. An "inference" class declaration (including a list of effects) is presented below:

```
class Inference {
    string cause;
    list<string> effects;
}
```

Examples of forward-chaining rules are presented in the code below:

```
rule "Inference rules - cause occurs before effect"
when
    $inference1: Inference( )
    $inference2: Inference( this before[0, 7d] $inference1, this.getEffects( ) contains
    $inference1.getCause( ))
then
    $inference2.updateEffects($inference1.getEffects( ));
    $inference2.mergeHierarchies($inference1.getHierarchy( ));
    update($inference2);
    retract($inference1);
end
rule "Inference rules - effect occurs before cause"
no-loop
when
    $inference1: Inference( )
    $inference2: Inference( this before[0, 7d] $inference1 , $inference1.getEffects( )
    contains this.getCause( ))
then
    $inference1.updateEffects($inference2.getEffects( ));
    $inference1.mergeHierarchies($inference2.getHierarchy( ));
    update($inference1);
    retract($inference2);
```

```
end
rule "Inference rule - merge inferences with same cause"
no-loop
when
    $inference1: Inference( )
    $inference2: Inference( this before[1ms, 7d] $inference1 , $inference1.getCause( ) ==
    this.getCause( ), this.getEffects( ) != $inference1.getEffects( ))
then
    $inference1.updateEffects($inference2.getEffects( ));
    $inference1.mergeHierarchies($inference2.getHierarchy( ));
    update($inference1);
    retract($inference2);
end
```

An example use case of the third (merging) rule is in the case of an interface down event, which may cause VPN packet loss (over potentially numerous VPNs) as well as customer latency and/or customer connectivity failures. The interface down event may be a direct parent of both consequent events, or may be an ancestor event via the transitive property of fault causality. Inference engine 226 may clearing one or more inferences upon clearing one or more corresponding events from event cache 614. Upon clearing an event from event cache 614, inference engine 226 may (i) delete, from inference database 218, all facts and inferences related to the cleared event; and (ii) reactivate all correlated events which were part of the deleted inference to create new inferences. Code denoting three different rules relating to inference clearing are presented below:

```
rule "Re-Inference Rule 1"
salience 10000
when
    $cleared_event: Event(clear==true)
    $inference: Inference(cause==$cleared_event.getId( ))
    $events : List( )
        from collect( Event( id memberOf $inference.getEffects( ) ))
then
    retract($inference);
    retract($cleared_event);
    for( int i = 0; i < $events.size( ); i++ ) {
        Event $event = (Event)$events.get(i);
        $event.updateClear(false);
        update($event);
    }
end
rule "Re-Inference Rule 2"
salience 10000
when
    $cleared_event: Event(clear==true)
    $inference: Inference(effects contains $cleared_event.getId( ))
    $events : ArrayList( )
        from collect( Event( id memberOf $inference.getEffects( ), id !=
$cleared_event.getId( )))
    $event_inf_cause : Event(id==$inference.getCause( ))
then
    $events.add($event_inf_cause);
    retract($inference);
    retract($cleared_event);
    for( int i = 0; i < $events.size( ); i++ ) {
        Event $event = (Event)$events.get(i);
        $event.updateClear(false);
    }
end
rule "Re-Inference Rule 3 -- Clear fact without inference"
salience 5000
when
    $cleared_event: Event(clear==true)
then
    retract($cleared_event);
end
```

Smart event generator 610 correlates events and identifies root cause events as part of the forward chaining inference-drawing process. Smart event generator 610 generates a smart event per root cause event along with a set of impacted events. Smart event generator 610 persists the smart event in an analytical databases (e.g., alerts/events database 616) to enable a user to initiate further actions, such as one or more of remediation actions 620.

Figure 9:
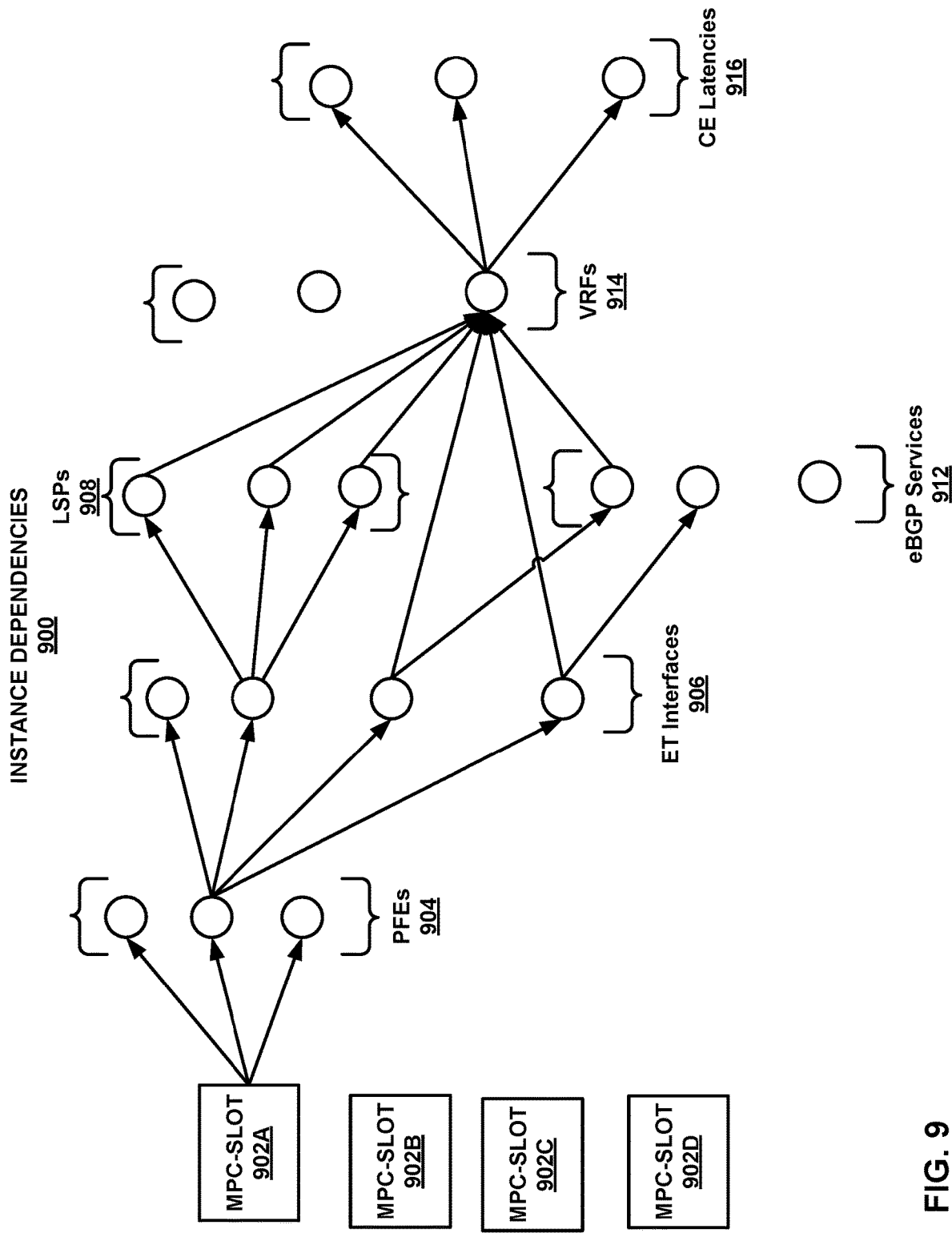
FIG. 9 is a conceptual diagram illustrating instance dependencies that the programmable diagnosis service of FIG. 2 may process in accordance with aspects of this disclosure.

FIG. 9 is a conceptual diagram illustrating instance dependencies 900 that programmable diagnosis service 224 may process in accordance with aspects of this disclosure. In the example shown in FIG. 9, inference engine creates a smart event with MPC-Slot 904A of MPC-Slots 904 as the root cause event. Impacted events include all of PFEs 904, all of Gigabit Ethernet® (ET) interfaces 906, all of label-switched paths (LSPs) 908, a subset of external Border Gateway Protocol (eBGP) services 912, a subset of VRFs 914, and a subset of customer edge device (CE) latencies 916. Programmable diagnosis service 224 may group all of the events occurring downstream of MPC-slots 904, and identify the failure of MPC-Slot 904A as the root cause (direct or transitive, as the case may be) of all of these downstream events.

Figure 10:
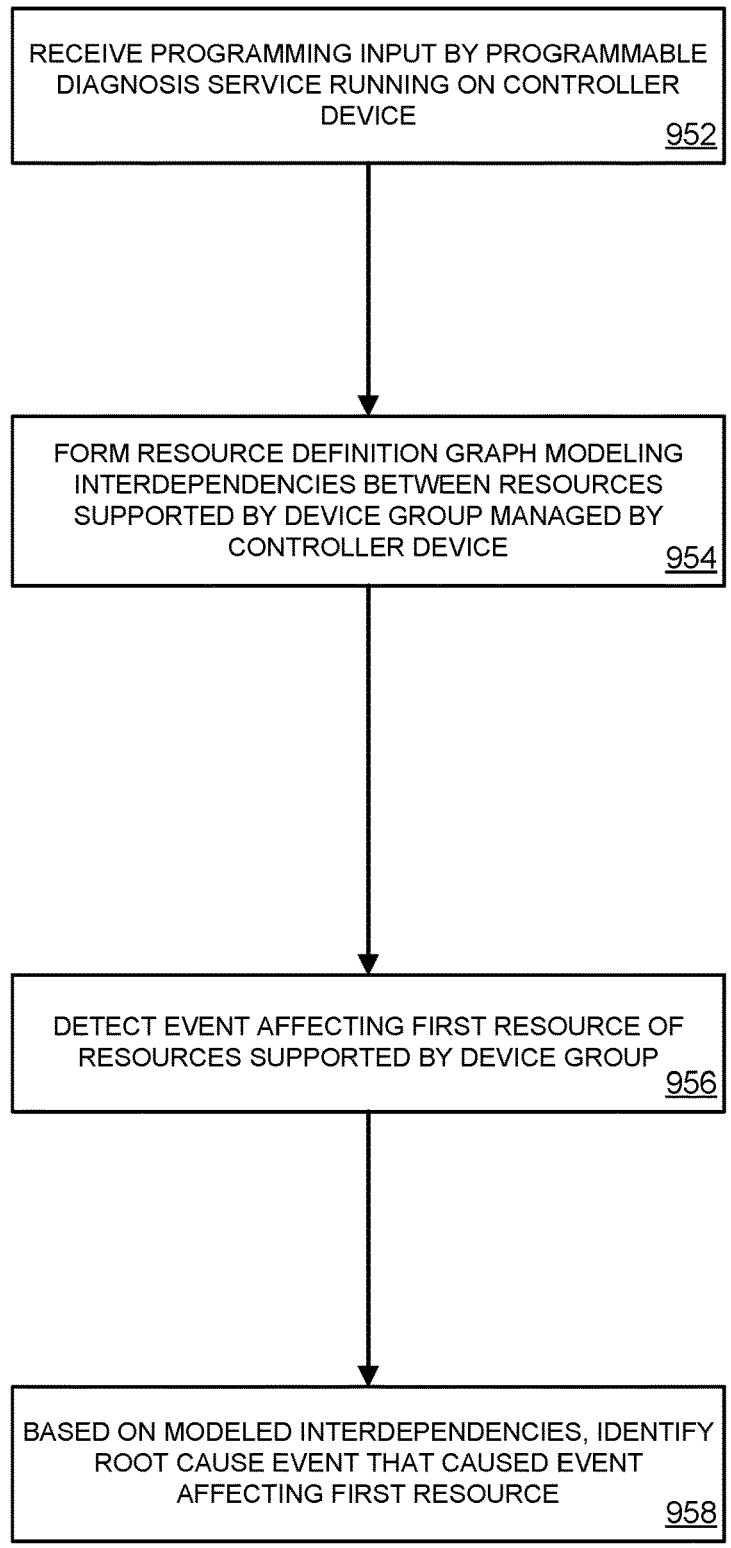
FIG. 10 is a flowchart illustrating process that a controller device may perform to monitor a device group of a network, in accordance with aspects of this disclosure.

FIG. 10 is a flowchart illustrating process 950 that controller device 110 may perform to monitoring a device group of network 102, in accordance with aspects of this disclosure. Process 950 may begin with programmable diagnosis service 224 (which runs on controller device 110 that manages the device group of network 102) receiving programming input 310 (952). In turn, programmable diagnosis service 224 may form any of resource definition graphs 402 that models interdependencies between a resources supported by the device group of network 102 that is managed by controller device 110, based on programming input 310 (954).

Programmable diagnosis service 224 may detect an event affecting a first resource of the resources supported by the device group managed by controller device 110 (956). In turn, programmable diagnosis service 224 may identify a root cause event that caused the event affecting first resource based on the interdependencies modeled in the respective resource definition graph 402 formed previously (958). Programmable diagnosis service may identify the root cause event as occurring at a second resource of the resources supported by the device group managed by controller device 110.

In some examples, to identify the root cause event that caused the event affecting the first resource comprises, programmable diagnosis service 224 may apply the respective resource definition graph 402 to at least a subset of the supported resources to generate one or more inference rules with respect to the supported resources, and may perform a forward-chained RCA by applying the one or more inference rules to events detected over the supported resources. In some examples, programmable diagnosis service 224 may initialize one or more telemetry rules that enable controller device 110 to monitor state information for one or more components of the device group and/or to instigate one or more alarms in response to detecting threshold events occurring within the supported resources. In some examples, to initialize the one or more telemetry rules, programmable diagnosis service 224 may configure first cause-and-effect relationships between device resources supported by the device group and second cause-and-effect relationships between service resources supported by the device group based on the programming input.

In some examples, to form the resource definition graph that models the interdependencies between the resources supported by the device group, programmable diagnosis service 224 may apply one or more temporal constraints to the modeled interdependencies. In some examples, the one or more temporal constraints include a constraint according to which the event affecting the first resource occurs after the root cause event occurring at the second resource. In some examples, the one or more temporal constraints include a constraint according to which the event affecting the first resource occurs before the root cause event occurring at the second resource. In some examples, the supported resources include one or more network resources, and programmable diagnosis service 224 may configure at least a subset of the one or more network resources.

In some examples, the supported resources include one or more service resource models, and programmable diagnosis service 224 may configure at least a subset of the one or more service resources. In some examples, the supported resources include one or more device resource models, and programmable diagnosis service 224 may configure at least a subset of the one or more device resources.

The techniques described in this disclosure may be implemented, at least in part, hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), fixed-function circuitry, programmable circuitry, or any other equivalent integrated or discrete logic circuitry, as well as any combination of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

Various examples have been described. These and other examples are within the scope of the following claims.

What is claimed is:

1. A method of monitoring a device group of a network, the method comprising:

forming, by a programmable diagnosis service running on a controller device that manages the device group, a resource definition graph that models interdependencies between a plurality of resources supported by the device group, wherein forming the resource definition graph includes:

forming, by the programmable diagnosis service, a set of vertices corresponding to resource models for the plurality of resources, the resource models including service resource models and device resource models, each of the resource models specifying a state representing an operational state of one of the plurality of resources corresponding to the resource model;

configuring, by the programmable diagnosis service, edges between the vertices in the set of vertices according to cause-and-effect relationships between the resource models, the edges representing the interdependencies between the plurality of resources; and forming, by the programmable diagnosis service, telemetry rules associated with the resource models, wherein the telemetry rules cause the programmable diagnosis service to collect state information representing the operational state of the plurality of resources, and to instigate one or more alarms in response to detecting threshold events occurring within the plurality of resources;

instigating, by the programmable diagnosis service, an alarm associated with a first resource of the plurality of resources in response to detecting an event affecting the first resource; and identifying, by the programmable diagnosis service, based on one or more of the edges connecting the resource model corresponding to the first resource to one or more other of the resource models, a root cause event that caused the event affecting the first resource, the root cause event occurring at a second resource of the plurality of resources.

2. The method of claim 1, wherein identifying the root cause event that caused the event affecting the first resource comprises:

applying, by the programmable diagnosis service, the resource definition graph to at least a subset of the plurality of resources to generate one or more inference rules with respect to the plurality of resources; and performing, by the programmable diagnosis service, a forward-chained root cause analysis (RCA) by applying the one or more inference rules to a plurality of events detected over the plurality of resources.

3. The method of claim 1, wherein forming the resource definition graph that models the interdependencies between the plurality of resources supported by the device group comprises applying, by the programmable diagnosis service, one or more temporal constraints to the modeled interdependencies.

4. The method of claim 3, wherein the one or more temporal constraints include a constraint according to which the event affecting the first resource occurs after the root cause event occurring at the second resource.

5. The method of claim 3, wherein the one or more temporal constraints include a constraint according to which the event affecting the first resource occurs before the root cause event occurring at the second resource.

6. The method of claim 1, wherein the plurality of resources comprises one or more network resources, the method further comprising configuring, by the programmable diagnosis service, at least a subset of the one or more network resources.

7. The method of claim 1, wherein the plurality of resources comprises one or more service resources, the method further comprising configuring, by the programmable diagnosis service, at least a subset of the one or more service resources.

8. The method of claim 1, wherein the plurality of resources comprises one or more device resources, the method further comprising configuring, by the programmable diagnosis service, at least a subset of the one or more device resources.

9. A controller system for managing a device group of a network, the controller system comprising:
a network interface;
a memory; and
processing circuitry in communication with the memory, the processing circuitry being configured to:
form, using a programmable diagnosis service executed by the processing circuitry, a resource definition graph that models interdependencies between a plurality of resources supported by the device group, wherein to form the resource definition graph, the processing circuitry is configured to:
form, using the programmable diagnosis service, a set of vertices corresponding to resource models for the plurality of resources, the resource models including service resource models and device resource models, each of the resource models specifying a state representing an operational state of one of the plurality of resources corresponding to the resource model;
configure, using the programmable diagnosis service, edges between the vertices in the set of vertices according to cause-and-effect relationships between the resource models, the edges representing the interdependencies between the plurality of resources; and
form, using the programmable diagnosis service, telemetry rules associated with the resource models, wherein the telemetry rules cause the programmable diagnosis service to collect state information representing the operational state of the plurality of resources, and to instigate one or more alarms in response to detecting threshold events occurring within the plurality of resources;
instigate, using the programmable diagnosis service, an alarm associated with a first resource of the plurality of resources in response to detecting an event affecting the first resource; and
identify, using the programmable diagnosis service, based on one or more of the edges connecting the resource model corresponding to the first resource to one or more other of the resource models, a root cause event that caused the event affecting the first resource, the root cause event occurring at a second resource of the plurality of resources.

10. The controller system of claim 9, wherein to identify the root cause event that caused the event affecting the first resource, the processing circuitry is configured to:
apply, using the programmable diagnosis service, the resource definition graph to at least a subset of the plurality of resources to generate one or more inference rules with respect to the plurality of resources; and
perform, using the programmable diagnosis service, a forward-chained root cause analysis (RCA) by applying the one or more inference rules to a plurality of events detected over the plurality of resources.

11. The controller system of claim 9, wherein to form the resource definition graph that models the interdependencies between the plurality of resources supported by the device group, the processing circuitry is configured to apply, using the programmable diagnosis service, one or more temporal constraints to the modeled interdependencies.

12. The controller system of claim 11, wherein the one or more temporal constraints include a constraint according to which the event affecting the first resource occurs after the root cause event occurring at the second resource.

13. The controller system of claim 11, wherein the one or more temporal constraints include a constraint according to which the event affecting the first resource occurs before the root cause event occurring at the second resource.

14. The controller system of claim 9, wherein the plurality of resources comprises one or more network resources, and wherein the processing circuitry is further configured to use the programmable diagnosis service to configure at least a subset of the one or more network resources.

15. The controller system of claim 9, wherein the plurality of resources comprises one or more service resources, and wherein the processing circuitry is further configured to use the programmable diagnosis service to configure at least a subset of the one or more service resources.

16. The controller system of claim 9, wherein the plurality of resources comprises one or more device resources, and wherein the processing circuitry is further configured to use the programmable diagnosis service to configure at least a subset of the one or more device resources.

17. A non-transitory computer-readable medium encoded with instructions that, when executed, cause processing circuitry of a controller device for managing a device group of a network to:
form, using a programmable diagnosis service executed by the processing circuitry, a resource definition graph that models interdependencies between a plurality of resources supported by the device group, wherein the instructions that cause the processing circuitry to form the resource definition graph include instructions that cause the processing circuitry to:
form, using the programmable diagnosis service, a set of vertices corresponding to resource models for the plurality of resources, the resource models including service resource models and device resource models, each of the resource models specifying a state representing an operational state of one of the plurality of resources corresponding to the resource model;

configure, using the programmable diagnosis service, edges between the vertices in the set of vertices according to cause-and-effect relationships between the resource models, the edges representing the interdependencies between the plurality of resources; and form, using the programmable diagnosis service, telemetry rules associated with the resource models, wherein the telemetry rules cause the programmable diagnosis service to collect state information representing the operational state of the plurality of resources, and to instigate one or more alarms in response to detecting threshold events occurring within the plurality of resources;

instigate, using the programmable diagnosis service, an alarm associated with a first resource of the plurality of resources in response to detecting an event affecting the first resource; and identify, using the programmable diagnosis service, based on one or more of the edges connecting the resource model corresponding to the first resource to one or more other of the resource models, a root cause event that caused the event affecting the first resource, the root cause event occurring at a second resource of the plurality of resources.

* * * * *